United States Patent [19]
Bennett

[11] Patent Number: 5,828,878
[45] Date of Patent: *Oct. 27, 1998

[54] METHOD AND A SCHEDULER FOR CONTROLLING WHEN A SERVER PROVIDES SERVICE WITH RATE CONTROL TO AN ENTITY

[75] Inventor: Jon C. R. Bennett, Pittsburgh, Pa.

[73] Assignee: FORE Systems, Inc., Warrendale, Pa.

[*] Notice: The term of this patent shall not extend beyond the expiration date of Pat. No. 5,828,879.

[21] Appl. No.: 476,365

[22] Filed: Jun. 7, 1995

Related U.S. Application Data

[63] Continuation-in-part of Ser. No. 375,624, Jan. 20, 1995, which is a continuation-in-part of Ser. No. 362,217, Dec. 22, 1994.

[51] Int. Cl.[6] .................................................... G06F 9/00
[52] U.S. Cl. ........................................ 395/672; 395/670
[58] Field of Search .................................... 395/650, 672, 395/673, 670

[56] References Cited

U.S. PATENT DOCUMENTS 5,142,533  8/1992  Crisler et al. ........................... 370/349

OTHER PUBLICATIONS

"Comparison of Rate–Based Service Disciplines", Hui Zhang and Srinivasan Keshav, SIGCOMM '91 Conference Communications, Architectures and Protocols, Zurich, Switzerland, 3–6 Sep. 1991, vol. 21, No. 4 ISSN 0146–4833, Computer Communication Review, Sep. 1991, USA, pp. 113–121, XP000260077.

"Virtual clocks and leaky buckets: flow control protocols for high–speed networks", Weinrib, A. et al, Protocols for High–Speed Networks, II. Proceedings of the IFIP WG 6.1/WG 6.4 Second International Workshop, Palo Alto, CA, USA, 27–29 Nov. 1990, ISBN 0–444–88932–9, 1991, Amsterdam, Netherlands, North–Holland, Netherlands, pp. 3–15, XP002049062.

"Dynamic Scheduling of Hard Real–Time Task and Real–Time Threads" by Karsten Schwon and Honguji Zhoo II Parallel Distributed Processing 1990.

*Primary Examiner*—Majid A. Banankhah
*Attorney, Agent, or Firm*—Ansel M. Schwartz

[57] ABSTRACT

A scheduler for controlling when N entities, where N is an integer greater than or equal to one, are operated upon by a server. The scheduler includes a starting time memory. The starting time memory has only arriving times which are greater than virtual time. The scheduler also includes a finishing time memory. The finishing time memory has finishing times of the N entities whose starting times are less than or equal to virtual time. Additionally, the scheduler includes a virtual clock that keeps track of virtual time so the arriving times and finishing times can be identified. Moreover, the scheduler is also comprised of a controller for choosing entities to be operated upon by the server from the finishing time memory. A method of scheduling when a server provides service to entities.

37 Claims, 16 Drawing Sheets

FIG.16

METHOD AND A SCHEDULER FOR CONTROLLING WHEN A SERVER PROVIDES SERVICE WITH RATE CONTROL TO AN ENTITY

This application is a continuation-in-part of application Ser. No. 08/375,624, filed Jan. 20, 1995 (status: pending), which is a continuation-in-part of application Ser. No. 08/362,217, filed, Dec. 22, 1994 (status: pending).

FIELD OF THE INVENTION

The present invention is related to a scheduler. More specifically, the present invention is related to a scheduler which allows an entity to receive service from a server before its finishing time.

BACKGROUND OF THE INVENTION

In circumstances where available resources must be shared among a number of different users, problems of congestion can occur for utilization of the resources. Quite simply, there may be times when different users desire to use a given resource at the same time, but the resource's capability only allows it to serve one user at a time. To control this congestion problem, a scheduler is typically utilized to order when a user has access to the server.

The Weighted Fair Queueing (WFQ) [Alan Demers, Srinivasan Keshav, and Scott Shenker. Analysis and simulation of a fair queueing algorithm. In *Proc. ACM SIGCOMM* '89, pages 1–12, Austin, Tex., September 1989] service policy is proposed as a method of providing fair service to sessions contending for a common resource in a packet switched network. Recently Parekh demonstrated that Weighted Fair Queueing, which he refers to as Generalized Processor Sharing (UPS), can provide strong delay bounds to sources which are leaky bucket constrained [Abhay Kumar J. Parekh. *A Generalized Processor Sharing Approach for Flow Control in Integrated Services Networks*. PhD thesis, Massachusetts Institute of Technology, Boston, Mass., February 1992]. Additionally, Fair Queueing can improve the performance of sessions carrying data (TCP [V. Jacobson and R. Braden. TCP extensions for long-delay paths; RFC 1072. *Internet Request for Comments*, (1072), October 1988]) even in the presence of other unconstrained sessions [J. Davin and A. Heybey. A simulation study of fair queueing and policy enforcement. *Computer Communication Review*, 20(5):23–29, October 1990] [Alan Demers, Srinivasan Keshav, and Scott Shenker. Analysis and simulation of a fair queueing algorithm. In *Proc. ACM SIGCOMM* '89, pages 1–12, Austin, Tex., September 1989].

Unfortunately idealized WFQ is very hard to implement in a high speed network, Self-Clocked Fair Queueing (SFQ) [S. Golestani. A self-clocked fair queueing scheme of broadband applications. Proceedings of *IEEE INFOCOM*, 1994] removes much of the implementation complexity of WFQ while providing a strong bound on the normalized difference in service received by any two sessions in a SFQ system compared with the difference in service the same sessions would have received in an ideal system.

However, the bound on the normalized disparity in service received by a connection in a SFQ system and that same connection in an idealized system may be quite large.

The original Fair Queueing scheme proposed by Nagle [J. Nagle. On packet switches with infinite storage. IEEE Trans. On Communications, 35(4):435–438, April 1987] involved providing each source with a FIFO queue for its packets and then servicing those queues in round-robin order, such that each time a queue is serviced the packet at the head of the queue is transmitted. This gives each source an equal share of the bandwidth, provided that all packets are the same size. If all packets are not the same size then a source which sends larger packets than other sources receives a correspondingly larger share of the bandwidth. A different definition of fair queueing proposed by Demers, Keshav and Shenker [Alan Demers, Srinivasan Keshav, and Scott Shenker. Analysis and simulation of a fair queueing algorithm. In *Proc. ACM SIGCOMM* '89, pages 1–12, Austin, Tex., September 1989] which involved providing service to the queues belonging to different sources on a bit at a time basis rather than a packet at a time. This bit-by-bit round-robin service provides each source with equal service which is independent of the size of the packets transmitted. By deliberately giving some queues more than one bit of service per round, the service known as weighted fair queueing is realized. Since it is not in fact possible to provide service on a bit-by-bit basis, the bit-by-bit model is used to determine in what order different packets would finish being completely transmitted, and the packets are then served on a packet by packet basis in that order. Additionally, if packets are associated with abstract entities known as flows or sessions rather than with their source, then it is possible to provide differing levels of service to separate logical connections regardless of their point of origin.

The most common observation as to the difficulty of implementing weighted fair queueing is that keeping track of which is the next packet to finish requires a priority queue which must operate at very high speeds.

In his study of the Generalized Processor Sharing service discipline, Parekh provides a packet-by-packet version he calls Packet-by-Packet Generalized Processor Sharing (PGPS), and provides an implementation based on a concept known as virtual time. The value of virtual time at any given time is denoted as V(t). In a PGPS system V(t) is computed from a GPS server reference model and is used to order the transmission of packets in the packet-by-packet server, very similar to the way packet-by-packet fair queueing uses the bit-by-bit model to determine the order of service.

In a GPS system the value of V(t) increases at a rate which is inversely proportional to the sum of the weights belonging to those sessions which have packets waiting in the GPS system. The formula for computing V(t) requires introducing a set of times corresponding to each arrival and departure in the GPS system. If $t_1=0$ and $t_j$ is the time at which the jth arrival or departure occurs (simultaneous departures and arrivals are arbitrarily ordered), then the value of V(t) any point in time is given as $$V(0) = 0$$

$$V(t_{j-1} + \tau) = V(t_{j-1}) + \frac{\tau}{\sum_{i \in B(t_j)} r_i},$$

$$\tau \leq t_j - t_{j-1}, j = 2,3, \ldots$$

where $B(t_j)$ is the set of sessions which are backlogged (i.e. have packets awaiting service) at time $t_j$ in the GPS reference server.

The most common observation as to the difficulty of implementing packet-by-packet generalized processor sharing is that in an arbitrarily small time period the number of events which occur in the GPS reference model may be as large as the number of different sessions. After each event (i.e. each arrival or departure) the set B may change which will change the slope of V(t). Determining which event comes next requires a priority queue of the events. This priority queue would at times have to operate even faster than the priority queue used to identify the packet with the smallest finishing time. Even if the list events can be processed in real time the computation of $\tau/\Sum_{i\in\beta(t_j)}\tau_i$ is also very expensive especially if it is to be done with enough precision to be accurate for small values of either $\tau$ or $\Sum_{i\in\beta(t_j)}\tau_i$. The expense of this computation and the resulting difficulty of performing it in real time motivated the Self-Clocked Fair Queueing service policy.

The Self-Clocked Fair Queueing algorithm proposed by Golestani in [S. Golestani. A self-clocked fair queueing scheme of broadband applications. *Proceedings of IEEE INFOCOM,* 1994] provides an alternative method of implementing fair queueing that can be realized in a high speed network The main difficulty in implementing a packetized version of fair queueing, referred to as PFQ, in a high speed network is the complexity of computing V(t) in real time. To solve this problem in an SFQ system, the value of V(t) is defined as the finishing time of the packet in service at time t. This definition leads to a great reduction in the implementation complexity. Unlike the definition of V(t) in (1) which is a continuous function, the definition of V(t) in packetized SFQ system results in a step function which may change only when a new packet starts service. As a result of this, the difference between V(t) in an SFQ system and V(t) in a UPS system can at times be considerable. We will show in Section 5 that it is possible for the value of virtual time in an SFQ system to either advance too quickly or not advance at all for very long periods of time when the system is in a busy period. As we will see this can detrimentally affect the strength of the service guarantees which can be provided by Self-Clocked Fair Queueing.

Ideally, the scheduler will provide the users access to the server in a fair manner so that no user will experience an undue delay based on its needs. In the past, scheduler's have not necessarily been fair to users when the users have a significant divergence in their needs. Many times, either the user with the greatest needs is left waiting while the user with the lowest needs is being served by the server, and vice versa. To solve this new scheduling algorithm Virtual Service Queueing (VSQ) is introduced which closely models WFQ. An approximation is presented of the theoretical VSQ algorithm and it is shown that there exists practical implementations in high speed networks. The present invention is directed to meeting the needs of users so users having lower needs can be served at times when users of greater needs do not require service at a given time. Furthermore, the present invention provides for rate control of the server so the server does not always have to be serving a user.

SUMMARY OF THE INVENTION

The present invention pertains to a scheduler for controlling when N entities, where N is an integer $\geq 1$, are serviced by a server. The scheduler comprises a starting time memory having starting times $s_i$ of the N entities, where $1 \leq I \leq N$ and is an integer, and $s_i$ corresponds to the time the i'th entity requests service from the server. The scheduler is also comprised of a finishing time memory having finishing times $f_i$ of the N entities, where $f_i$ corresponds to the time the i'th entity should be serviced by the server. The scheduler is also comprised of a virtual clock that keeps track of virtual time so the starting times $s_i$ and finishing times $f_i$ can be identified. Additionally, the scheduler comprises a controller which chooses entities to receive service from the server in the order of the entities with an earliest finishing time $f_i$ and a starting time $s_i$ being serviced first, and then the entities with the earliest or latest starting time $s_i$ or having the highest or lowest id or rate if their finishing times are the same being serviced next at each given time. If rate control is used, then there is the alternative criteria of if there is no entity with a starting time less than or equal to virtual time, the server does not provide service to any entity and the virtual clock increments virtual time by one unit of virtual time. In rate control, the virtual time is always incremented by sore unit of virtual time, and preferably one unit of virtual time, as a function of time regardless of what the server is doing. Preferably, the function of time is simply a predetermined period of time. As is apparent from the latter, if the entities' finishing times are the same, then whatever protocol is desired to indicate which entity is to be provided to the server to be operated upon is the choice of the operator.

The present invention pertains to a method of scheduling when a server provides service to entities. The method comprises the steps of requesting service from the server by N entities, where $N \geq 1$ and is an integer. Then there is the step of storing when each of the N entities starts requesting service and when each of the N entities should have received service. Next, there is the step of providing service to an entity of the N entities which has the earliest receive time and start time, unless there is more than one entity with the earliest receive time in which case the entity with the earliest start time receives service and possibly before its receive time. If rate control is used, then there is the alternative criteria of if there is no entity with a start time less than or equal to virtual time, then the server is idle and virtual time is incremented by some unit of virtual time as a function of time.

The present invention pertains to a scheduler for scheduling when N entities each of which has a weight w, where N is an integer $\geq 1$ and w is a real number, are served by a server. The scheduler is comprised of a starting time memory having starting times $s_i$ when the N entities request service, where $1 \leq I \leq N$ and is an integer, and $s_i$ is the time at which the i'th entity may next get service from the server. The scheduler is also comprised of a finishing time memory having finishing times $f_i$ when the N entities should be serviced, where $f_i$ is the time by which the i'th entity should be serviced by the server. The scheduler is also comprised of a virtual clock that keeps track of time $V_k$ where $k \geq 0$ and is an integer and $$V_k = MAX((V_{k-1}+P)+(1*X)+((1/AW)*T), (s_{Smin}*Y)+((f_{Fmin}-s_{Smin})*Z))$$

where $(|P|+|T|+|X|)*(|Y|+|Z|)>0$ where $s_{Smin}$ is the earliest start time $s_i$ of when an entity requests service from the server; $f_{Fmin}$ is the earliest finish time of an entity waiting for service from the server; $V_{k-1}$ is the virtual time when the server last served an entity; AW=sum over all entities currently asking for service of $w_i$, where $w_i$ is the i'th entity's weight; and P, X, T, Y and Z are real numbers. Preferably, P=1, T=0, X=1, Y=1 and Z=0, but based on the application and the purpose, either T or X can be essentially any real number as long as both are not 0; and either Y or Z can be essentially any real number as long as both are not 0. If rate control is utilized, then Y=Z=0 and the last line of the equation is not applicable.

The scheduler is also comprised of a controller which chooses which entity is to be operated upon by the server in the order of the entity with an earliest finishing time $f_i$ and a start time $s_i$ receiving service first, and then the entities based on a predetermined criteria. The predetermined criteria can essentially be any type of tie-breaking procedure that the user wishes to apply such as earliest start time or id number, etc. If rate control is utilized, there is the alternative criteria of if there is no entity with a start time less than or equal to virtual time, the server does not provide service to any entity and the virtual clock increments virtual time preferably by one unit of virtual time as a function of time and preferably after a predetermined period of time.

The present invention pertains to a method for scheduling when a server provides service to entities. The method comprises the steps of identifying when a first entity requests service from the server. Next there is the step of providing service to an entity, such as a first entity or a second entity, as a function of when the entity requests service from the server. If rate control is utilized, then the providing step is a function of virtual time, and there is the additional step of incrementing virtual time by one unit of virtual time after a predetermined period of time.

The present invention pertains to a scheduler for controlling when a server provides service to entities. The scheduler comprises a memory having times which are a function of when entities request service from the server. The scheduler is also comprised of a virtual clock that keeps track of virtual time as a function of when entities request service from the server. The scheduler is also comprised of a controller which causes an entity to receive service from the server as a function of when the entity requests service from the server. If rate control is utilized, then the virtual clock keeps track of time as a function of time and preferably a predetermined period of time.

The present invention pertains to a scheduler for controlling when N entities, where N is an integer greater than or equal to one, are operated upon by a server. The scheduler comprises a starting time memory having arriving times $s_i$ of the N entities, where I is greater than or equal to 1 and less than N and is an integer, and $s_i$ corresponds to the time the i'th entity first requests service from the server. The starting time memory has only arriving times $s_i$ which are greater than virtual time. The scheduler is also comprised of a finishing time memory having finishing times $f_i$ of the N entities, where $f_i$ corresponds to the time the i'th entity is to be operated upon by the server. The finishing time memory has finishing times $f_i$ of the N entities whose starting times $s_i$ are less than or equal to virtual time. Additionally, the scheduler is comprised of a virtual clock that keeps track of virtual time so the arriving times $s_i$ and finishing times can be identified. Moreover, the scheduler is also comprised of a controller for choosing entities to be operated upon by the server from the finishing time memory, for entering entities into the finishing time memory from the starting time memory whose arriving times $s_i$ become less than or equal to virtual time and into the starting time memory whose arriving times $s_i$ are greater than the virtual time, and for deleting entries from the starting time memory whose arriving times $s_i$ become less than or equal to virtual time. The controller is connected to the starting time memory, finishing time memory, and the virtual clock.

The present invention pertains to a scheduler for controlling when N entities, where N is an integer greater than or equal to one, are operated upon by a server. The scheduler comprises a starting time memory having arriving times $s_i$ of the N entities and the identity of at least the entity having the earliest arriving time, where I is greater than or equal to one and less than N and is an integer and $s_i$ corresponds to the time the i'th entity first requests service from the server. The scheduler is also comprised of a finishing time memory having finishing times $f_i$ of the N entities and the identity of at least the entity having the earliest finishing time, where $f_i$ corresponds to the time the i'th entity is to be operated upon by the server. The scheduler comprises a virtual clock that keeps track of virtual time so the arriving times $s_i$ and finishing times $f_i$ can be identified. The scheduler is comprised of a controller for choosing entities to be operated upon by the server from the finishing time memory and which have arriving times $s_i$ less than or equal to the virtual time. The controller is connected to the starting time memory, finishing time memory, and virtual clock. By maintaining the identities of the earliest arriving and finishing times, it is not necessary to use a second finishing time.

The present invention pertains to a method of scheduling when a server provides service to entities. The method comprises the steps of requesting service from the server by N entities, where N is greater than or equal to one and is an integer. Next, there is the step of storing when each of the N entities first requests service from the server, the identity of each of the n entities which request service from the server and when each of the N entities is to have received service from the server. Then, there is the step of providing an entity of the entities service which has the earliest receiving time and a request time which is less than or equal to virtual time. Next, there is the step of incrementing virtual time by one unit of virtual time after a predetermined time.

The present invention pertains to a method for controlling when N entities, where N is greater than or equal to one and is an integer, are operated upon by the server. The method comprises the steps of storing in a starting time memory arriving times $s_i$ of the N entities which are greater than virtual time, where I is greater than or equal to one and less than N and is an integer, and $s_i$ corresponds to the time the i'th entity first requests service from the server. Next there is the step of storing in a finishing time memory finishing times $f_i$ of the N entities whose arriving times $s_i$ are less than or equal to virtual time. Next, there is the step of providing service from the server to an entity having a finishing time $f_i$ in the finishing time memory.

BRIEF DESCRIPTION OF THE DRAWINGS

In the accompanying drawings, the preferred embodiment of the invention and preferred methods of practicing the invention are illustrated in which:

FIGS. 2–11 are schematic representations of cells waiting for service from a server as a function of virtual time.

FIGS. 12–20 are schematic representations of cells waiting for service from a server as a function of virtual time.

DESCRIPTION OF THE PREFERRED EMBODIMENT

Figure 1:
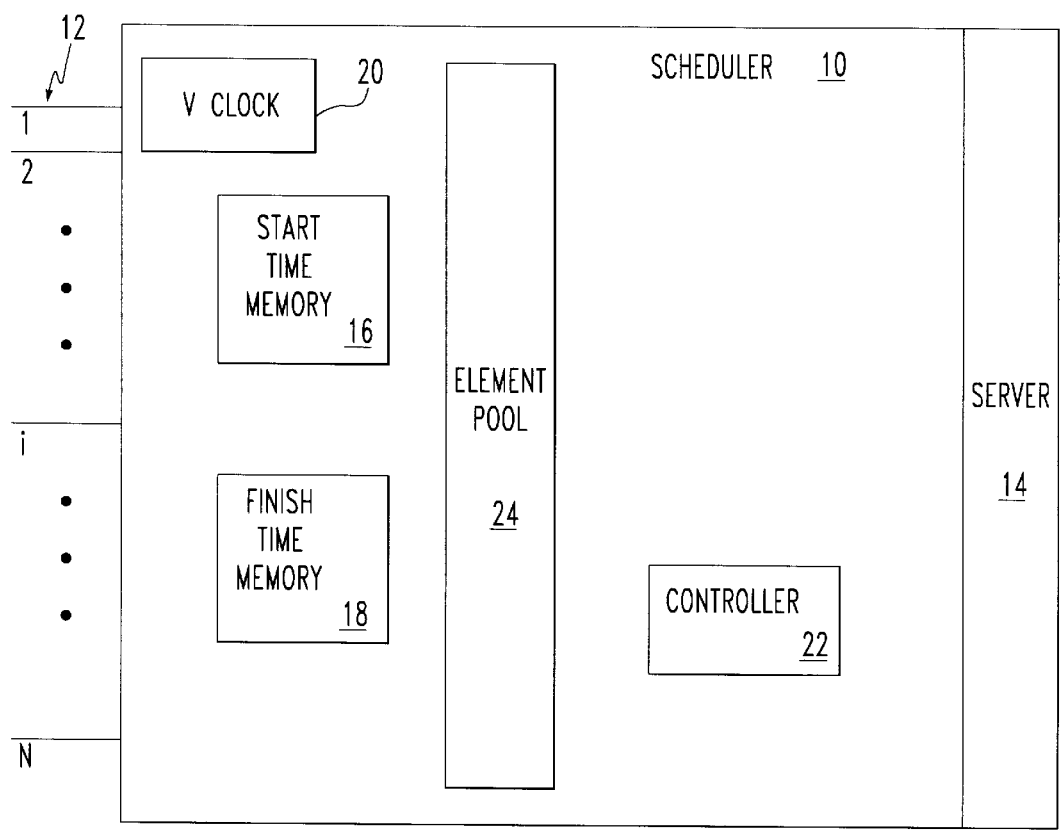
FIG. 1 is a schematic representation of the present invention.

Referring now to the drawings wherein like reference numerals refer to similar or identical parts throughout the several views, and more specifically to FIG. 1 thereof, there is shown a scheduler 10 for controlling when N entities 12, where N is an integer $\geq 1$, are operated upon by a server 14. The scheduler 10 comprises a starting time memory, such as a priority queue 16, having starting times $s_i$ of the N entities, where $1 \leq I \leq N$ and is an integer, and $s_i$ corresponds to the time the i'th entity starts requesting service from the server 14. The scheduler 10 is also comprised of a finishing time memory, such as a priority queue 18, having finishing times $f_i$ of the N entities 12, where $f_i$ corresponds to the time the i'th entity should be operated upon by the server 14. The scheduler 10 is also comprised of a virtual clock 20 that keeps track of time so the starting times $s_i$ and finishing times $f_i$ can be identified. Additionally, the scheduler 10 comprises a controller 22 which provides entities service from the server 14 in the order of the entities with an earliest finishing time $f_i$ and a start time $s_i$ being operated upon first, and then the entities with the earliest or latest starting time $s_i$ or having the highest or lowest id or rate if their finishing times are the same being operated upon next at each given time. As is apparent from the latter, if the entities' finishing times are the same, then whatever protocol is desired to indicate which entity is to be provided to the server 14 to be operated upon is the choice of the operator. If rate control is used, then there is the alternative criteria of if there is no entity with a starting time less than or equal to virtual time, the server does not provide service to any entity and the virtual clock increments virtual time by one unit of virtual time as a function of time and preferably after a predetermined period of time. It should be noted that even when the server does not provide service, the virtual clock increments virtual time by one unit of virtual time. Thus, virtual time always advances by one increment of virtual time.

Preferably, scheduler 10 can include an element pool 24 which is connected with the N entities 12 and receives elements from the N entities 12 to be operated upon by the server 14. The arrival times $s_i$ of elements then corresponds to the time elements from the i'th entity 12 arrives in the element pool 24 and the finishing times $f_i$ correspond to the time an element from the i'th entity 12 is to leave the element pool 24 and be operated upon by the server 14.

The controller 22 transfers or chooses elements to be operated upon by the server 14 from the element pool 24. Preferably, the controller 22 is connected to the virtual clock 20, the element pool 24, the starting time priority queue 16 and the finishing time priority queue 18 for controlling time of the virtual clock 20, storing the elements in the element pool 24, and the arrival times $s_i$ and their finishing times $f_i$ in the starting time priority queue 16 and the finishing time priority queue, respectively. The controller 22 preferably operates upon entities or elements of the element pool 24 sequentially. Preferably, the controller 22 causes the virtual clock 20 to move present virtual time forward when an entity receives service or an element leaves the element pool 24. The controller 22 can cause the virtual clock 20 to increment virtual time to the earliest starting time of an entity or an element if the earliest start time of an entity is later than virtual time, otherwise, the controller 22 causes the virtual clock 20 to increment virtual time by a unit of virtual time. If rate control is utilized, then the controller only causes the latter to occur preferably after a predetermined time if no service is provided.

In the embodiment with an element pool 24 present, the controller 22 transfers the element out of the element pool 24 which has the earliest finishing time $f_i$ and a starting time $s_i$ unless there is more than one element with the earliest finishing time fi, in which case, preferably, the element with the earliest starting time $s_i$ is transferred out of the element pool 24 by the controller 22 and before its finishing time $f_i$, unless there is no element with a starting time $s_i$ less than or equal to virtual time, in the element pool, in which case no element is transferred out of the element pool 24 by the controller if rate control is utilized.

The present invention pertains to a scheduler 10 for scheduling when N entities each of which has a weight w, where N is an integer $\geq 1$ and w is a real number, are served by a server 14. The scheduler 10 is comprised of a starting time memory 16 having starting times $s_i$ when the N entities 12 request service, where $1 \leq I \leq N$ and is an integer, and $s_i$ is the time at which the i'th entity may next get service from the server 14. The scheduler 10 is also comprised of a finishing time memory 18 having finishing times $f_i$ when the N entities should be serviced, where $f_i$ is the time by which the i'th entity should be serviced by the server 14. The scheduler 10 is also comprised of a virtual clock 20 that keeps track of time $V_k$ where $k \geq 0$ and is an integer and $$V_k = \text{MAX}((V_{k-1}+P)+(1*X)+((1/AW)*T), (s_{Smin}*Y)+((f_{Fmin}-s_{Smin})*Z))$$

where $(|P|+|T|+|X|)*(|Y|+|Z|)>0$ where $s_{Smin}$ is the earliest start time $s_i$ of when an entity requests service from the server 14; $f_{Fmin}$ is the earliest finish time of an entity waiting for service from the server 14; $V_{k-1}$ is the virtual time when the server 14 last served an entity; AW=sum over all entities currently asking for service of $w_i$, where $w_i$ is the i'th entity's weight; and P, X, T, Y and Z are real numbers. Preferably, P=1, T=0, X=1, Y=1 and Z=0, but based on the application and the purpose, either T or X can be essentially any real number as long as both are not 0; and either Y or Z can be essentially any real number as long as both are not 0. If rate control is utilized, then Y=Z=0 and the last line of equation (1) is not applicable, or in other words, $V_k = V_{k-1}+1$.

The scheduler 10 is also comprised of a controller which chooses which entity is to be operated upon by the server 14 in the order of the entity with an earliest finishing time $f_i$ and a start time $s_i$ receiving service first, and then the entities based on a predetermined criteria. The predetermined criteria can essentially be any type of tie-breaking procedure that the user wishes to apply such as earliest start time or id number, etc. If rate control is utilized, there is the alternative criteria of if there is no entity with a start time less than or equal to virtual time, the server does not provide service to any entity and preferably the virtual clock increments virtual time by one unit of virtual time.

More specifically, let wi be the "weight" of the i'th entity where $0<w_i<=1$. $W_i$ represents the fractional share of the server 14 which the i'th entity is entitled to (if $w_i=1$ then the server 14 is totally dedicated to the i'th entity, if $w_i=0.5$ then ½ of the server's work is dedicated to the i'th entity). Note: in this context "1" is used to represent the maximum rate of work of the server 14, so it makes no sense to give a single entry a weight which would be equal to greater than 100% of the capacity of the server 14).

Preferably, the sum of the weights of all entities will be less than or equal to 1 if the entities are not restricted as to how much work they can ask the server 14 to perform. This is equivalent to not allocating more than 100% of the server 14 capacity. If an entity is somehow restricted from asking for more than some fraction (say $RS_i<1$) of the server's capacity, then a more general statement is that the sum (over all entities) of $MIN(w_i, RS_i)$ should be less than 1.

Let W=sum over all entities of $w_i$ $$W = \sum_{1}^{N} w_i$$

Let AW=sum over all entities current asking for service of $w_i$ (i.e. if "W" is sum of Weights then "AW" is sum of Active Weights)

$$AW = \sum_{1}^{N} w_i * a_i$$

where $a_i=0$ if not asking for service, $a_i=1$ if asking for service.

Additionally, $s_i$ is the time at which the i'th entity may next get service and $f_i$ is the time by which the i'th entity should be serviced.

Let $u_i$ be the number of units of work that the server gives the i'th entity when it does work for the i'th entity (for simplicity assume the case where for all entities $u_i=1$ (in the case of a packet network this is equivalent to the case where all packets are of the same size, i.e. ATM cells)). $U_i$ can be different than one based on the application. For instance, $u_i$ may not be equal to one in a packet based network.

Let Fmin (1<Fmin<N)=id # of entity with the smallest finishing time (all examples given as "entity with the smallest finishing time" is understood to mean "entity that is to finish first based on any needed tie breaking").

So $f_{Fmin}$=value of the finishing time of the entity with the smallest finishing time.

Let Smin (1<=Smin<N)=id # of entity with the smallest starting time (what is meant here is the same as above, i.e. if there are ties assume that they are broken somehow).

So $s_{Smin}$=value of the starting time of the entity with the smallest starting time.

$V_k$ indicates the k'th time that the server does work.

$$V_k = MAX(V_{k-1}(1*X), (s_{Smin}*Y)+((f_{Fmin}-s_{Smin})*Z)) \quad (2)$$

Each time the server 14 performs work, it services the entity whose id # is Fmin. The server does not need to know the value of Smin to operate, it only needs to know the value of $s_{Smin}$.

$$V_k = MAX(V_{k-1}+((1/AW)*T), (s_{Smin}*Y)+((f_{Fmin}-s_{Smin})*Z)) \quad (3)$$

where $(|T|*(|Y|+|Z|))>0$
Another equation is:
Equation (1) is Equations (2) and (3) together.
Equation (1) with

```
--+--+
P | 1
T | 0
X | 1
--+--+
Y | 0
Z | 0
``` is "Virtual Clock" (VC). See Zhang, L. (1989) "A new architecture for packet switching network protocols". Report LCS TR 455, Laboratory for Computer Science, Massachusetts Institute of Technology. Cambridge, Mass., incorporated by reference.

Equation (1) with

```
--+--+
P | 0
T | 0
X | 0
--+--+
Y | 1
Z | 1
``` is "Self-Clocked Fair Queueing" (SFQ). See "A Self-Clocked Fair Queueing Scheme for Broadband Applications" by S. J. Golestani, In Proc. IEEE Infocom, May 1994, incorporated by reference.

It is worth noting that in this case, the second half of the equation looks like $(s_{Smin}*1)+((f_{Fmin}-s_{Smin})*1))$ or $s_{Smin}+f_{Fmin}-s_{Smin}$ or $f_{Fmin}$ (and in this case the value "$s_{Smin}$" is not actually needed) and in fact, this is how it is conceptually described in the literature Equation (1) with

```
--+--+
P | 1
T | 1
X | 0
--+--+
Y | 0
Z | 0
``` is "approximately" "Weighted Fair Queueing" (WFQ). See "Analysis and Simulation of a Fair Queueing Algorithms" by A. Demers, S. Keshav, and S. Shenker; Internetworking: Research and Experience, Vol. 1, 3–26 (1990), incorporated by reference, and A. K. J. Parekh, A Generalized Processor Sharing Approach to Flow Control in Integrated Services Networks, Ph.D. Dissertation, Massachusetts Institute of Technology, Cambridge, Mass., February 1992, incorporated by reference.

The real problem with this version from an implementation point of view is two-fold.

a) the computation of "AW" in this case usually requires emulating the fluid model rather than the discrete model of the server b) the computation 1/AW is very expensive, and difficult to perform (if AW=(1-epsilon) then 1/AW=1/(1-epsilon) which is hard to compute accurately)
Equation (1) with

```
  --+--+
  P | 1
  T | 0
  X | 1
  --+--
  Y | 1
  Z | 0
``` is "Virtual Service Queueing" (VSQ) of the present invention.

The reason for making these observations is two-fold.
a) observing that the pairs P,T,X and Y,Z represent the two halves of the MAX function, it is clear that only VSQ has non-zero coefficients on both sides of the function.
b) if the function is rewritten in the case of SFQ to be the way that the equation is normally written in the literature then it is also clear that only VSQ utilizes the value $s_{Smin}$.

A variation of VSQ is "Rate Control Service Queueing" (RC VSQ). When rate control is implemented Y=Z=0. But unlike VC which is not concerned with the starting time of when a user requests service from the server 10, RC VSQ requires the starting times of users to be identified and particularly the smallest starting time of a user as well as finishing times of users. Thus, in the preferred embodiment, RC VSQ comprises a starting time memory, such as the priority queue 16, as described above, and a finishing time memory, such as a priority queue 18, as described above. Then, in operation of RC VSQ, the server 10 provides service in the following manner:

If the starting time of Fmin ($s_{Fmin}$) is less than or equal to the virtual time, then service Fmin; else if the starting time of Smin ($s_{Smin}$) less than or equal to the virtual time, then service Smin; else do nothing and increment virtual time by one unit.

More succinctly written:

If $S_{Fmin} \leq V$, then service Fmin, else if $s_{Smin}) \leq V$, then service Smin, else do nothing, $V_k = V_{k-1} + 1$.

When rate control is implemented, the server 10 provides service at the established rate, whatever that may be, and no faster. Rate control is not necessarily work conserving while VSQ is work conserving.

Figure 22:
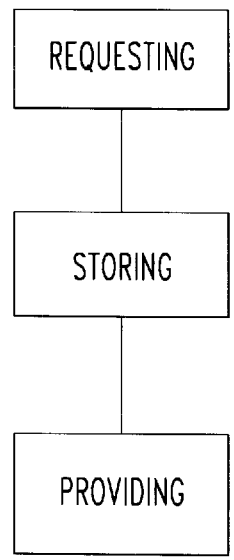
FIG. 22 is a flow chart of a method of scheduling when a server provides service to entities of the present invention.

The present invention pertains to a method of scheduling when a server 10 operates on entities, as shown in FIG. 22. The method comprises the steps of requesting service of the server from N elements, where $N \geq 1$ and is an integer. Then there is the step of storing when each of the N entities first requests service and when each of the N entities is to have received service from the server. Next, there is the step of providing service to an entity of the N entities which has the earliest receive time and a request time, unless there is more than one entity with the earliest receive time in which case the entity with the earliest request time receives service from the server. Preferably, after the providing step, there is the step of repeating the providing step in regard to other entities. The controller 22 can cause the steps to be implemented. If rate control is used, then there is the alternative criteria of if there is no entity with a request time less than or equal to virtual time, then the server is idle.

Figure 23:
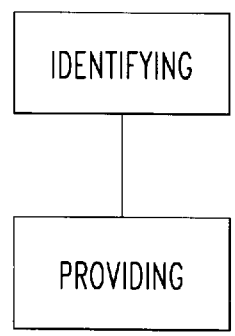
FIG. 23 is a flow chart of an alternative method of scheduling when a server provides service to entities of the present invention.

The present invention also pertains to a method for scheduling when a server 14 provides service to entities, as shown in FIG. 23. The method comprises the steps of identifying when an entity requests service from the server 14. The process for identifying when a first entity requests service from the server can include any technique or method for calculating when the first entity requests service from the server 14. This can include identifying when the request occurs by actually determining the time when the entity requests service from the server 14. Or, it can be calculated from when a previous entity has requested service from the server 14 and determined by some function or relationship when the entity requests service from the server 14. Or, it can be determined as a function of another entity which is currently receiving service from the server 14. Alternatively, the time when the first entity requests service can be identified from a time when the entity is to receive service from the server 14. For instance, start time plus $1/W_i$ equals finish time.

Additionally, the identifying step can be part of a calculation where at some point in the overall process of identifying time for the server to provide service to the entity, the time when the entity requests service from the server is identified. Basically, the identifying step can be a conclusion to a process or as an interim step to a process. The entity preferably is a first entity which requests service from the server 14.

The method for scheduling when a server 14 provides service to entities next comprises the step of providing service to an entity as a function of when the entity requests service from the server 14. The entity can be the first entity and it receives service from the server 14 as a function of when the first entity requests the service from the server 14. It is preferably when the first entity first requests service from the server 14 that is a basis for providing service to the first entity. Alternatively, the step of providing service to an entity can be the step of providing service to a second entity as a function of when the first entity requests service from the server 14. The time when the second entity receives service is then some functional relationship of when the first entity first requested service from the server 14. For instance, if service is provided to the first entity at V=1, then service to the second entity is provided at time V=2 or V=1+1, where V=1 is the time the first entity requests service from the server 14. If rate control is utilized, then the providing step is a function of virtual time, and there is the additional step of incrementing virtual time by one unit of virtual time after a predetermined period of time. In the preferred embodiment, virtual time is incremented by one unit of virtual time after a predetermined period of time, regardless of any other considerations.

The present invention pertains to a scheduler for controlling when a server provides service to entities. The scheduler comprises a memory, having times which are a function of when entities request service from the server 14. The scheduler 10 also comprises a virtual clock 20 that keeps track of time as a function of when entities request service from the server 14. Additionally, the scheduler 10 comprises a controller 22 which causes an entity to receive service from the server 14 as a function of when the entity requests service from the server 14. The memory can be a starting time, such as a priority queue 16. If rate control is utilized, then the virtual clock keeps track of time as a function of a predetermined period of time whether or not there is no service provided to an entity.

In the operation of the invention, several users receive service from a server 14. The users have cells which either at separate times or at the same time require the operation of the server 14. As long as no user having cells calls upon the server 14 at the same time, or are waiting for the server 14, a user will request service from the server 14 and receive service from it. However, if this is not the case, then a scheduler 10 will schedule when the users with cells will be served by the server 14.

During operation, the scheduler 10 logs in the time a user first requests service from the server 14. The scheduler 10 also logs in the latest time the user should finish waiting for service from the server 14. The scheduler 10 records the start time and the finish time for each user that requests service from the server 14. This information is obtained from the user and from the virtual clock 20 identifying when the user has first started waiting for the service from the server 14. This can occur by the entity sending a signal to the server 14 or the scheduler 10 when it requests service; or by the scheduler 10 or the server 14 using a sensor, or trigger to identify when the entity is requesting service. This aspect of the invention can be similar to how a telecommunications switch operates to switch signals which arrive at the switch from several connections, as is well known in the art.

When the server 14 is available to service a user, the scheduler 10 determines which user of the users waiting for service from the server 14 has the earliest finishing time. The user with the earliest finishing time is then provided service by the server 14 and the user's cell is operated upon by the server 14. If the users have the same finishing time, then the server looks at which user has the earliest start time and provides service to the user with the earliest start time. The scheduler 10 causes the user to receive service from a server 14 even though its time to finish waiting for service may not as yet have occurred.

As each user is served by the server 14, the scheduler 10 looks for the next user to receive service from the server 14. A user that has a high rate will receive service from the server 14 more often than a user with a lower rate. However, as the user with the higher rate receives service from server 14, there will be instances where a user with a lower rate will receive service from the server 14 because it will have an earlier finish time and/or an earlier start time than a user with a higher rate. Because the scheduler 10 is not controlled by the user receiving service from the server 14 when its finish time occurs, users with lower rates can receive service from the server 14 intermittently when the server 14 is not providing service to a higher rate. Thus, because the server 14 is controlled by the fact that over a given unit cycle of operation, it has certain service capability, and that all the rates of the different users combine to equal that unit rate for the cycle, then over the course of a cycle, each user will have service provided by the server 14.

As a simple example, five users A–E have rates of 0.5, 0.2, 0.1, 0.1, 0.1, respectively. At time V=0, each user A–E has a cell which arrives for service from a server 14. The cell from user A has a finishing time of V=2, the cell from user B has a finishing time of V=5, and the cells from users C, D and E have finishing times of V=10. This is shown in FIG. 2.

At time V=0, since the cell from user A is present and it has the earliest finishing time of V=2 of all the cells waiting for service, the server 14 services user A. Because the server 14 services user A, the time is advanced one unit to V=1.

Figures 2, 3, 4, 5, 6:
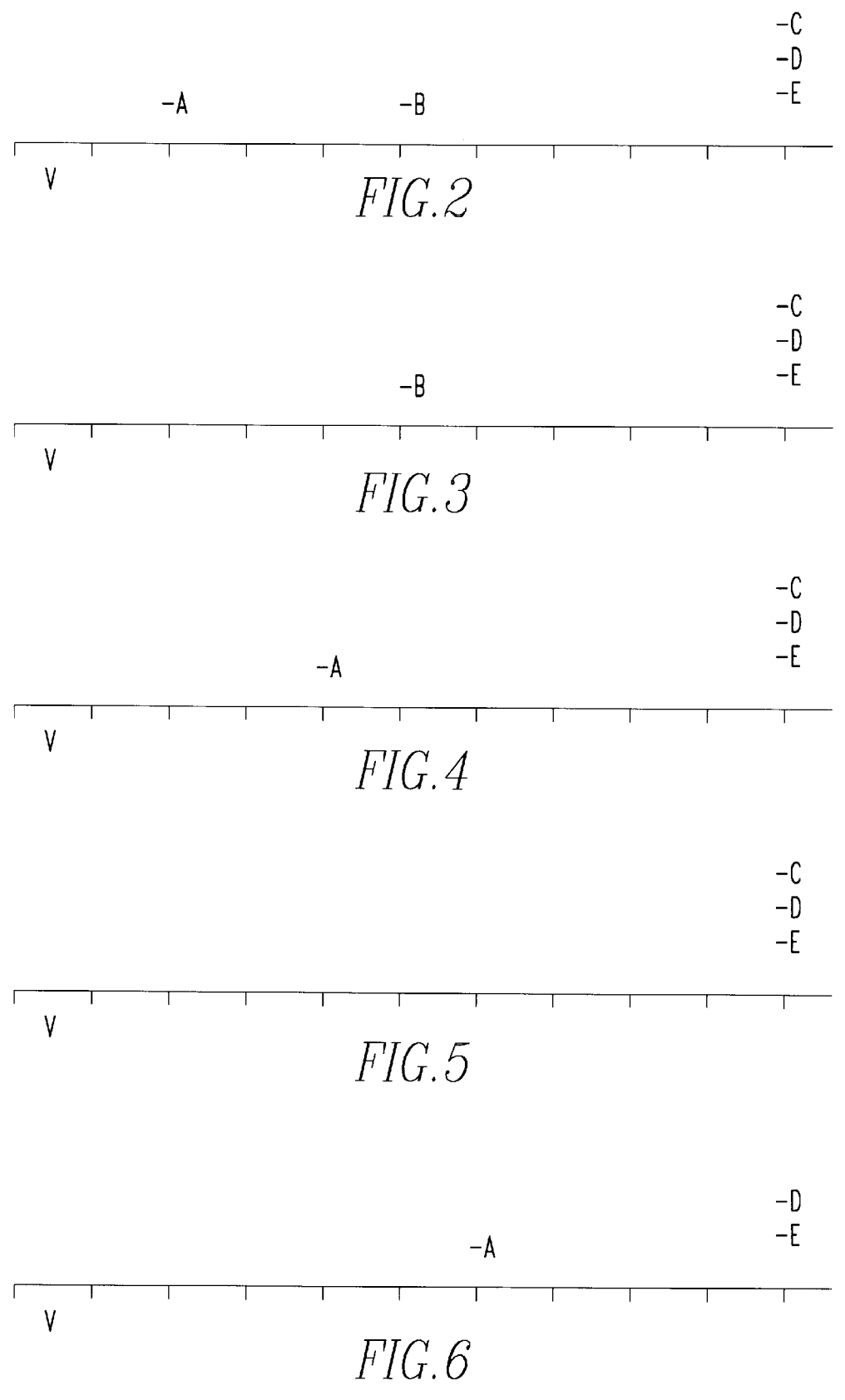

At time V=1, the server 14 serves the cell from user B, since it has the earliest finishing time of V=5, as shown in FIG. 3. Since the server 14 operates on the cell of user B, the time is incremented by one unit so V=2.

At V=2, a cell from user A arrives having a start time of V=2 and a finish time of V=4, as shown in FIG. 4. At V=2, the server 14 services the cell from user A because the finishing time for the cell of user A of V=4 has the earliest finish time. When server 14 operates on the cell of user A, the time is advanced to V=3.

At time V=3, the server 14 operates on the cell from user C since it has as early a finish time of V=10 as any of the cells waiting for service, as shown in FIG. 5. Upon the server 14 serving the cell from user C, the time is advanced to V=4.

At time V=4, a cell from user A arrives to be serviced by the server 14. It arrives at time V=4 and has a finish time of V=6, as shown in FIG. 6. The server 14 serves the cell from user A since it has the earliest finish time of V=6. The time is then advanced to V=5.

Figure 7:
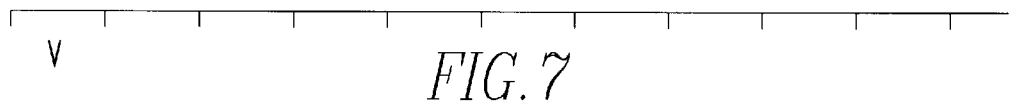

At time V=5, a cell from user B arrives to receive service from server 14. The cell has a start time of V=5 and a finish time of V=10. At time V=5, the server 14 provides service to the cell from user D since all the cells waiting for service have the same finish time but the cell from user D has a start time of 0, which is as early as a cell from user E but earlier than the cell from user B. See FIG. 7. After the server 14 services the cell from user D, the time is advanced to V=6.

Figure 8:
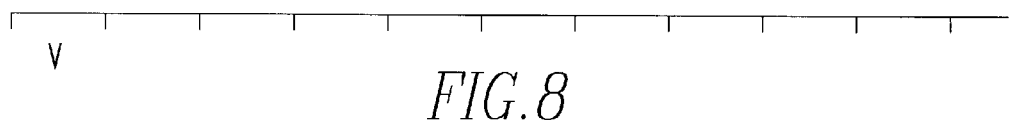

At time V=6, a cell from user A arrives for service from server 14. The cell has a starting time of V=6 and a finish time of V=8. The server 14 provides service to the cell from user A since the cell has the earliest finish time of the cells waiting for service from server 14. See FIG. 8. Upon servicing by the server of the cell from user A, the time is advanced to V=7.

Figure 9:
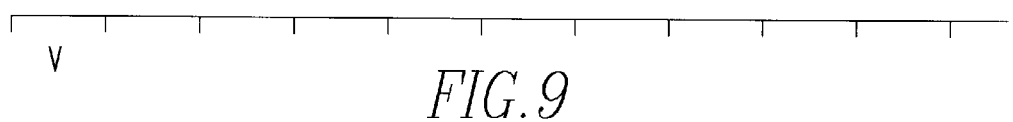

At time V=7, the server 14 provides service to the cell from user E since it has the earliest start time of V=0 and the same finish time as the cell from user B waiting for service from the server 14. See FIG. 9. After the server 14 provides service to the cell from user E, the time is advanced to V=8.

Figure 10:
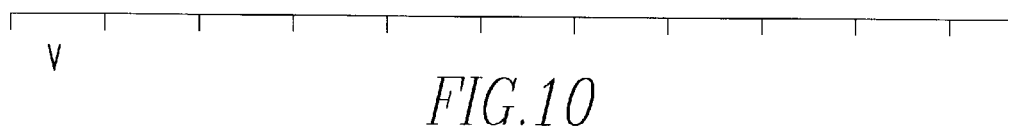

At time V=8, a cell from user A arrives for service from the server 14. At time V=8, the server 14 provides service to the cell from user B since it has the earliest start time of V=5 and the same finish time as the cell from user A waiting for service from the server 14. See FIG. 10. After the server 14 provides service to the cell from user B, the time advances to V=9.

Figure 11:
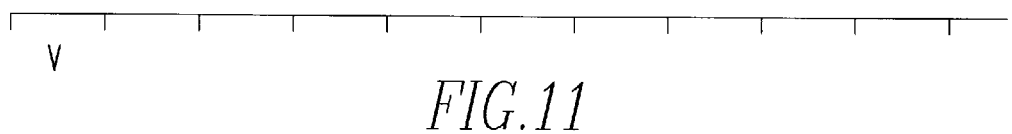

At time V=9, the server 14 provides service to the cell from user A since it has the earliest finish time of any cells waiting for service from the server 14. See FIG. 11. See FIG. 11. At this point in time, a unit cycle has been completed and all the users have received service. After the server 14 provides service to the cell of user A, the time advances to V=10.

At time V=10, a cell from user A arrives for service with a finish time of V=12, a cell from user B arrives for service with a finish time of V=15, and a cell from each of users C, D and E arrive with finish times of V=20 (not shown). The cycle then repeats itself as described above.

Another simple example that describes operation of the scheduler when the rates of the users add to be less than one is now given. In this example, there are three users A–C having rates of 0.5, 0.2 and 0.1, respectively.

Figures 12, 13, 14, 15, 16:
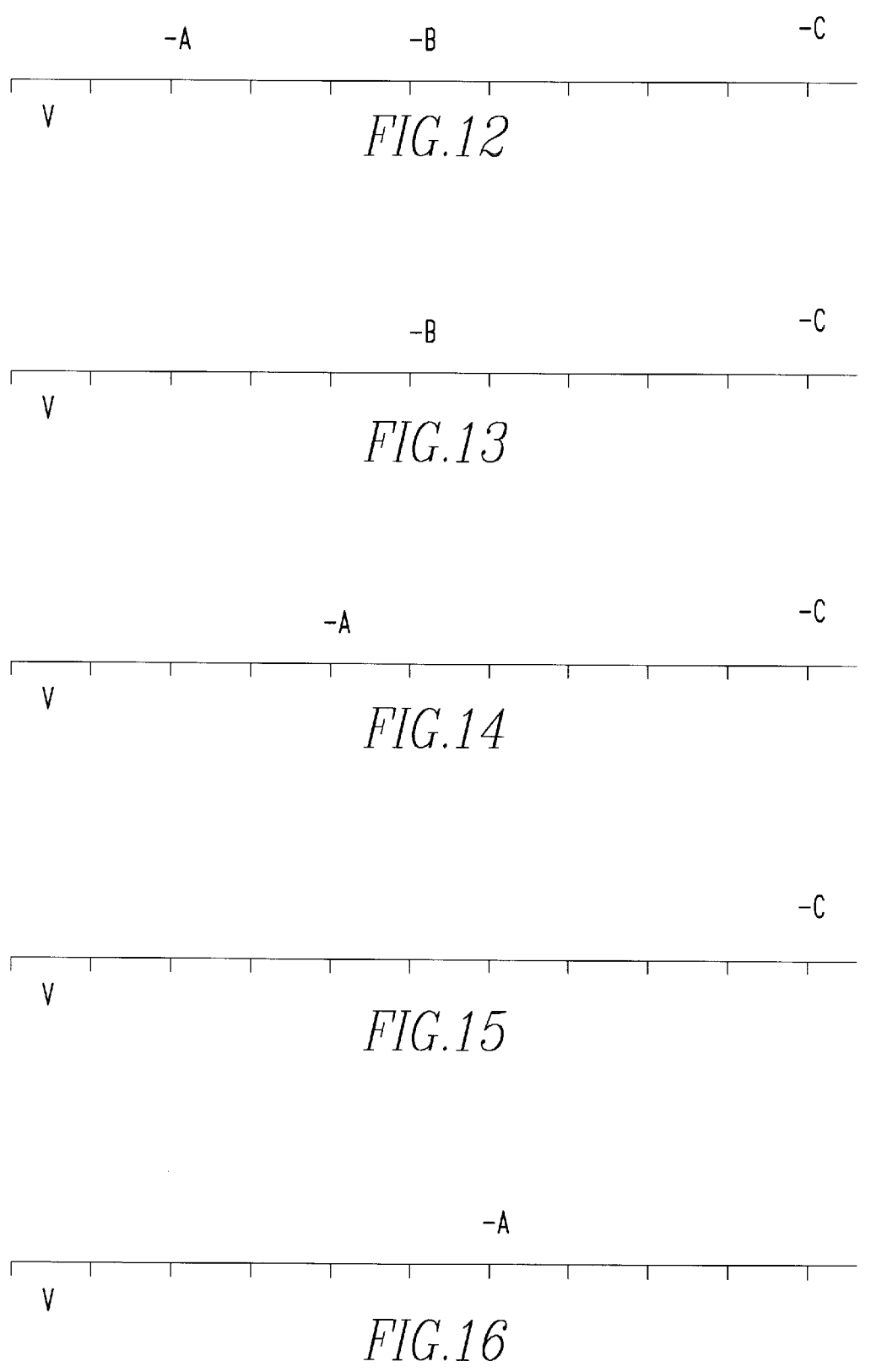

At time V=0, cells from user A, B and C have arrived having start times of V=0. The cell from user A has a finish time of V=2, the cell from user B has a finish time of V=5, and the cell from user C has a finish time of V=10. See FIG. 12. At V=0, the cell from user A receives service from server 14 since it has the earliest finishing time of V=2 of the cells. Because the server 14 services user A, the time is advanced one unit to V=1.

At V=1, the server 14 services the cell from user B, since it has the earliest finishing time of V=5 of the cells. See FIG. 13. The time is then advanced by one increment to V=2.

At time V=2, a cell from user A arrives for service from the server 14. The server 14 services the cell from user A since it has the earliest finish time of V=4 of the cells. See FIG. 14. The time is then advanced by one increment to V=3.

At time V=3, the server provides service to the cell from user C since it is the only cell that has a starting time earlier than the present virtual time of V=3 and it also has a finish time of V=10. See FIG. 15.

After the server 14 services the cell from user C, the virtual time is advanced by one increment to the earliest starting time of a cell that requires service from the server 14. In this case, the earliest starting time of a cell waiting for service is V=4, which happens to be one increment of time from V=3.

At time V=4, a cell from user A arrives for service from the server 14. The server 14 provides service to the cell from user A since it has a start time of V=4, which is equal to the present virtual time, and has a finish time of V=6 which is the earliest finishing time of any cell waiting for service from the server 14. See FIG. 16. Upon the server 14 providing service to the cell from user A, there being no other cells having starting times earlier or at the present virtual time of V=4, the virtual time is incremented to the earliest start time of a cell that desires service from server 14. In this case, the virtual time is incremented by one unit to V=5 since the cell from user B will have a start time of V=5 when it requests service from the server 14.

Figure 17:
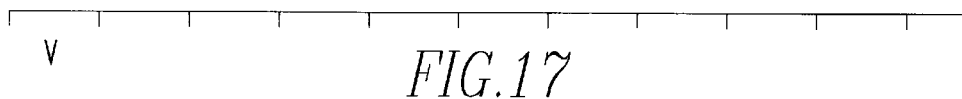

At time V=5, a cell from user B arrives for service from server 14. At time V=5, the server from server 14 provides service to the cell from user B since the cell from user B has the earliest finish time of any cell waiting for service from server 14. See FIG. 17. Upon the server 14 providing service to the cell from user B, the virtual time is incremented to the next virtual time that corresponds to the earliest start time that a cell would require service from the server 14. In this instance, a cell from user A has a start time of V=6. Accordingly, time is incremented by one unit to V=6.

Figure 18:
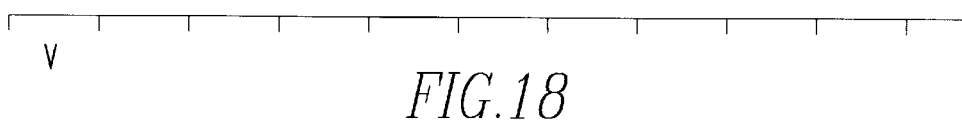

At time V=6, a cell from user A arrives for service from server 14. At time V=6, the server 14 provides service to the cell from user A because it has the earliest finish time. See FIG. 18. The virtual time is then incremented to V=8 and not to V=7 since the earliest start time of a cell waiting for service from server 14 will occur at V=8. Thus, the virtual time is incremented by two units in this instance. It should be noted that if a rate control embodiment was implemented where the virtual time is incremented by 1 unit of time, then virtual time would be incremented to V=7, not V=8. At V=7, the server 14 would not provide service to any user. After a predetermined period of time, the virtual time is then incremented one unit to V=8.

Figure 19:
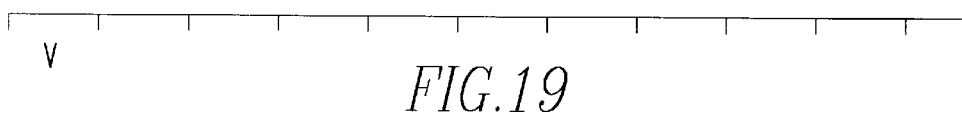

At time V=8, a cell from user A arrives for service from the server 14. Server 14 provides service to the cell from user A since it has the earliest finish time. See FIG. 19. After the server 14 provides service to the cell from user A, time is incremented to V=10 since at V=10 is the earliest start time for cells waiting for service from server 14. The virtual time is then incremented by two units from V=8 to V=10.

Figure 20:
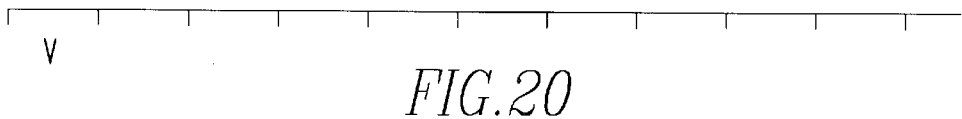

At V=10, cells from users A, B and C arrive for service from server 14. The finish time for the cell from user A is V=12, the finish time for the cell from user B is V=15 and the finish time for the cell from user C is V=20 (not shown). At V=10, there are no cells appearing for service since the figure only goes up to V=10 but V=10 is shown in FIG. 20 since there are finish times associated with V=10, although they are not shown.

Several examples of the implementation of the invention are found in the appendix. Note, the RC before VSQ stands for rate control in two of the examples. To better understand these examples which show elements which are preferably cells in regard to an ATM network arriving into an element pool 24 to be operated upon by a server 14, several operations of the scheduler 10 will be described.

In example 1, there are three entities 12 connected to an element pool 24. These entities 12 have associated with them a weight and a rate. For instance, user 0 associated with the 0th entity 12 has a weight of 0.5 and a rate of 0.5. User 1 associated with the first entity 12 has a weight of 0.333 and a rate of 0.333. User 2 associated with the second entity 12 has a weight of 0.166 and a rate of 0.166. At time T=1, the virtual time is 0. Cells 000, 001 and 002, corresponding with the 0th, 1st, 2nd entities 12 of the 0th, 1st and 2nd users arrive at the element pool 24. Their start times when they first started in the element pool 24 and their finish times when they are to have left the element pool 24 are recorded in the starting priority queue 16 and the finishing time priority queue 18, respectively. This is shown in the start time column and the finish time column and the start queue column and the finish queue column.

In the start time column, user 0 has the second or last position in regard to when the cell 000 associated with the 0th user arrived in the element pool 24. The time that the 0th element arrived in the element pool is at time T=0. In the finish time column, the user 0 has the first or 0th position, since its finish time of T=2000 is the earliest finishing time of all the elements in the element pool 24. For user 0, there is a quantity Q identified in the column Q showing there is but 1 cell of user 0 in the element pool 24. In the start queue column, user 0 is in the last or second position and its starting time T=0. However, in the finishing time priority queue 18 under the finish queue column, user 0 is in the 0th position because the time T=2000 is the earliest finishing time of all the elements in the element pool 24.

In regard to user 1, it has a start time position of 1 and an associated start time T=0. Its finish time position is also 1 because its finish time of T=3000 is the second earliest finishing time of the three cells in the element pool 24. There is a quantity of one cell in the element pool 24 associated with user 1 and in the starting time priority queue 16, the user 1 is in the 1 position with its time T=0. User 1 also has the 1 position in the finish queue column since its time to finish is the second earliest of the cells in the element pool 24.

User 2 has the earliest or 0th position in the starting time priority queue 16 and has time T=0. It has a finishing time position of last or 2 since its time T=6000 is the latest finish time of all the cells in the element pool 24. The user 2 has a quantity Q of one cell in the element pool 24 and a start queue position of 0 with a time T=0. In the finishing time priority queue 18, it has a finish queue position of 2 because its finish time of T=6000 is the latest finishing time of the three cells in the element pool 24.

In operation at time 0000, the cell of user 0 is operated upon by the server 14. This is reflected by the user 0 having a start time of −1 with a time T=0 and a finish time of position −1 for time T=2000. The quantity Q of user 0 is now 0 since its corresponding cell has been operated upon by the server 14 and is no longer in the element pool 24. In the starting time priority queue 16, the user 0 has a position of −1 with a time T=−1 reflecting the fact that the user 0 is no longer present in the element pool. The finishing time priority queue 18 also reflects the finishing queue of user 0 having a −1 in the element pool 24 since the cell associated with user 0 is no longer present in the element pool 24. Because the server can only operate on one cell at a time, only the cell of user 0, which has the earliest finishing time, is removed from the element pool 24. The remaining users have their positions moved up one notch in regard to their finish time since now time T=3000 for the cell of user 1 is the earliest finishing time and the time T=6000 for the cell associated with user 2 is now the second latest finishing time. Also, as is apparent from the example, since all the cells of user 0, 1 and 2 have arrived at the same starting time in the element pool 24, even though their weights may be different, they are ordered in the starting time priority queue 16 on the basis of highest user number to lowest user number, although essentially any scheme of ordering could be chosen.

At time T=2 and the virtual time now equal to 1000 (since the server 14 has just operated on a cell, the virtual time is increased by one unit of virtual time—here 1000) new cells from user 1, user 2 and user 3 arrive at the element pool 24. User 0 has a start time of T=2000 since that is the time identified with its arrival in the start time priority queue 16. It has a position of 1 in the finish time priority queue 18 because its finish time T=4000 is second earliest of the cells in the finish time. In addition, the quantities of user 1 and user 2 are now both 2 since each of these users also have additional cells in the element pool 24 at time T=2. Since user 1 has the earliest finishing time of 3000 of all the cells in the element pool 24, and it also has a start time of T=0 which is earlier than the time V=1000 and is thus present in the element pool 24, then it is this cell which is the cell in the element pool 24 which is provided to the server 14 to be operated upon by the server 14. Thus, in the next operation of the server 14, the server 14 serves the cell of user 1 that has the finishing time of T=3000. This cell is removed from the element pool 24, and the starting time priority queue 16 and finish time priority queue 18 are thus adjusted. The quantity of cells for user 1 is now reduced to 1 while the quantity of cells for user 0 remains 1 and the quantity of cells for user 2 remains 2. Since there is a remaining cell still in the element pool 24 for user 1, its presence becomes apparent in the start time column with a time T=3000 and a finish time of T=6000 in the finish time column.

At time T=3, V=2000 since a cell was operated upon by this server 14 causing the virtual time of V=1000 to be incremented by one unit of time. At time T=3 and V=2000, only one new cell arrives. This new cell is from user 0. This is reflected by the quantity of cells in the element pool 24 being 2 for the user 0. At this time, user 0 has a cell in the finishing time priority queue 18 of T=4000, which is the earliest finishing time. Since this cell also has a start time of T=2000, it is present in the element pool 24 at time V=2000 and it is the cell to be operated upon by the server 14. When the server operates at T=3 and virtual time equal to 2000, the cell of user 0 having finishing time T=4000 is removed from the element pool 24 and is operated upon by the server 14. The quantity of cells associated with user 0 in the element pool 24 is then reduced by 1.

At this point, all the finishing times of all the cells of the users are T=6000. Thus, in regard to the finishing times all being equal, the start times then become controlling in terms of which cell is operated upon next by the server. This can be seen at time T=4 and V=3000 where user 2 has two cells in the element pool 24 with the earliest one having a start time T=0. It is this cell of user 2 that is then operated upon by the server 14. The remainder of the examples should be understood based on the explanation above.

Figure 21:
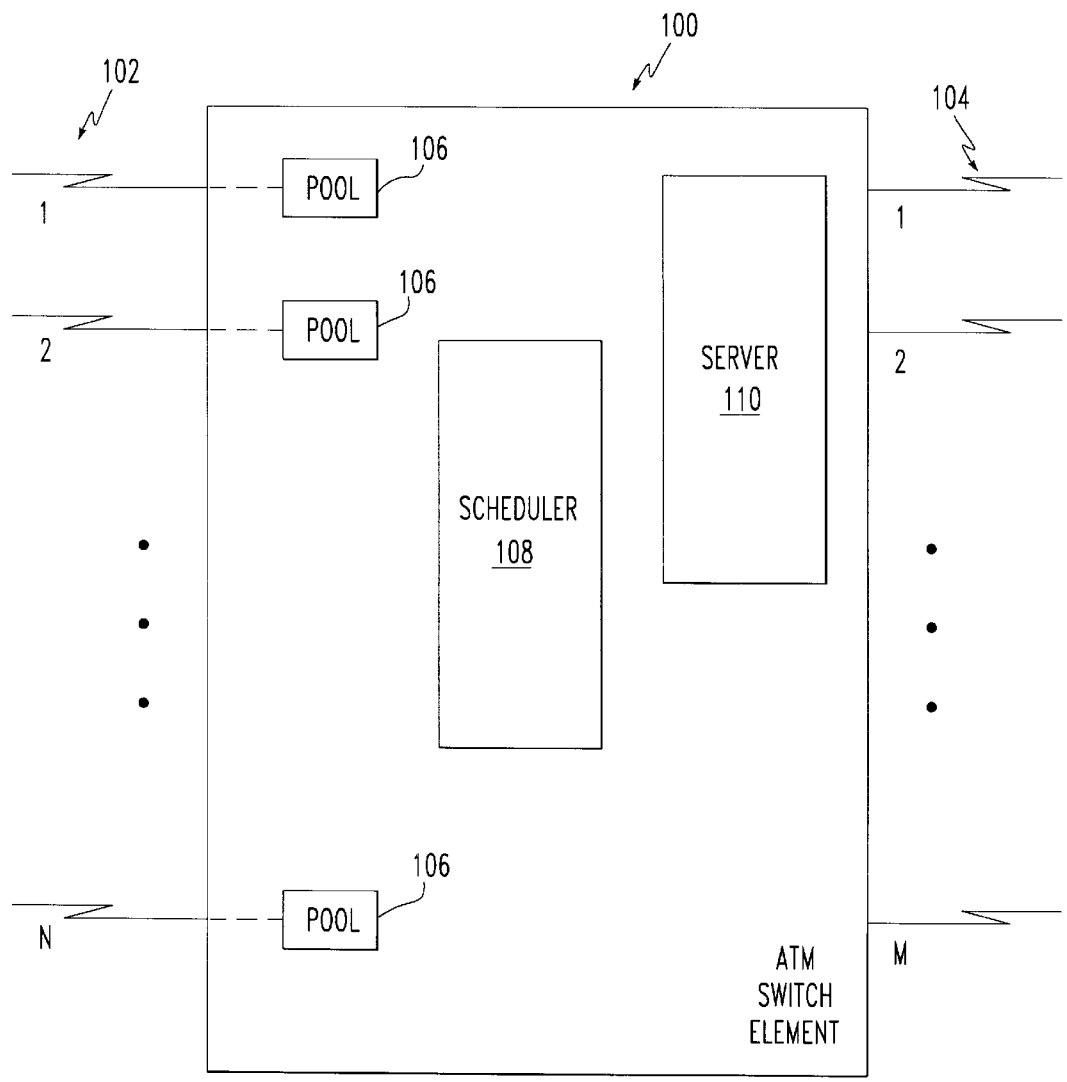
FIG. 21 is a schematic representation of an ATM switch element.

In a specific application of the invention, an ATM switch element has one to N input connections 102 and one to M output connections 104, as shown in FIG. 21. ATM cells are received by the switch element 100 through the input connections 102. The switch element 100 operates on the cells and sends them on their way through output connections 104. Whenever a cell comes in over a specific input connection 102, it is placed in a pool 106, as is well known in the art, and informs the scheduler 108 of the switch element, as is well known in the art, of the presence of the cell in the corresponding pool 106. It should be noted that each input connection 102 can have its own unique pool 106 in which cells entering the switch element 102 are stored or there can be a common pool 106 in which all cells from each individual input connection 102 are stored until the server 110 of the switch element is ready to operate upon them.

The scheduler 108 of the switch element 100 operates as described above except in the ATM context, the finish time is determined by the finish time identified in the scheduler for the cell as well as a bid value that has been provided by the cell in order to obtain service by the server 110 of the switch element 100. This use of a bid is well known in the art. See, for instance, "Gigabit Networking" by Craig Partridge, Addison Wesley, 1994; "ATM User Network Interface Specification, Version 3.0" by the ATM Forum, Prentice Hall, 1994; "Asynchronous Transfer Mode Networks: Performance Issues", by Raif O. Onvural, Artech House, Inc., Norwood, Mass. 1994, and "Comparison of Rate-Based Service Disciplines" by Hui Zhang and Srinivasov Keshav, Proceedings of ACMSIGCOMM '91, all of which are incorporated by reference.

In regard to packets, every packet can be stamped as is known in the art. Furthermore, as is known in the art, and from the above, the packet at the head of a queue can be computed based on the above and not all of the packets in that queue need to be stamped. Ideally, the first N packets could be stamped, and any packets thereafter would not need to be stamped, where N is the maximum number of service intervals a packet can be late in receiving service.

Generally, for the i'th packet, $$S_k^i = \text{MAX}(F_k^{i-1}, v(a_k^i)),$$

$$F_k^i = S_k^i + \frac{L_k^i}{w_k^i}$$

where L=length of the i'th packet and $a_k^i$ is the arrival time of the i'th packet for service and $v(a_k^i)$ is the virtual time at the arrival time $a_k^i$.

Figure 24:
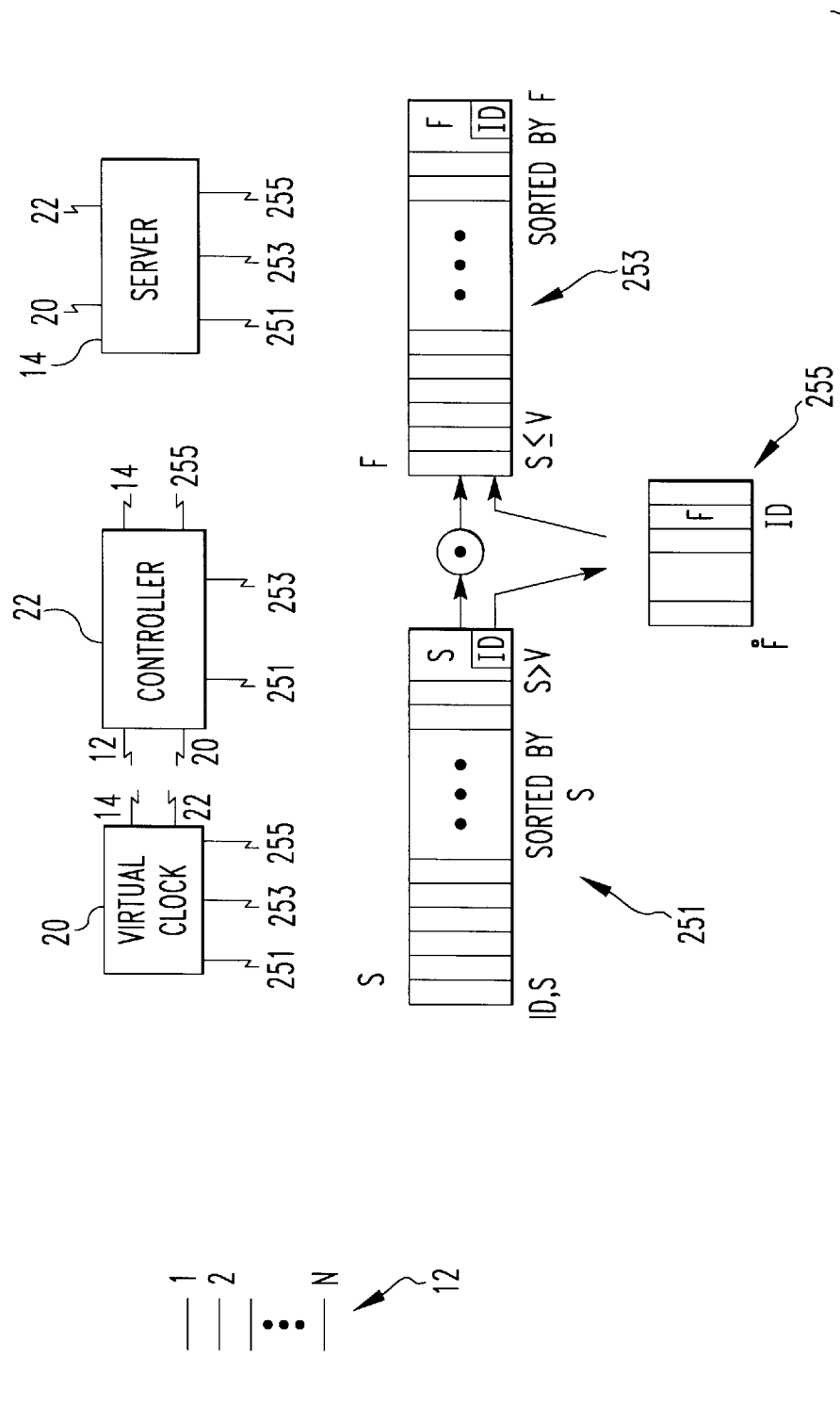
FIG. 24 is a schematic representation of an alternative embodiment of a scheduler of the present invention.

The present invention pertains to a scheduler 10 for controlling when N entities 12, where N is an integer greater than or equal to one, are operated upon by a server 14, as shown in FIG. 24. The scheduler 10 comprises a starting time memory 251 having arriving times $s_i$ of the N entities 12, where I is greater than or equal to 1 and less than N and is an integer, and $s_i$ corresponds to the time the i'th entity first requests service from the server 14. The starting time memory 251 has only arriving times $s^i$ which are greater than virtual time. The scheduler 10 is also comprised of a finishing time memory 253 having finishing times F of the N entities 12, where F corresponds to the time the i'th entity is to be operated upon by the server 14. The finishing time memory 253 has finishing times F of the N entities 12 whose starting times $s_i$ are less than or equal to virtual time. Additionally, the scheduler 10 is comprised of a virtual clock 20 that keeps track of virtual time so the arriving times s and finishing times can be identified. Moreover, the scheduler 10 is also comprised of a controller 22 for choosing entities 12 to be operated upon by the server 14 from the finishing time memory 253, for entering entities 12 into the finishing time memory 253 from the starting time memory 251 whose arriving times $s_i$ become less than or equal to virtual time and into the starting time memory 251 whose arriving times $s_i$ are greater than the virtual time, and for deleting entries 12 from the starting time memory 251 whose arriving times $s_i$ become less than or equal to virtual time. The controller 22 is connected to the starting time memory 251, finishing time memory 253, and the virtual clock 22.

The entities 12 have arriving times $s_i$ in the starting time memory 251 are sorted in order of descending times with the entity 12 having the smallest arriving time being first, and the controller 22 stores entities having starting times $s_i$ greater than virtual time in the starting time memory 251 in order of descending arriving times with the entity 12 having the smallest arriving time being first.

The finishing times $f_i$ in the finishing time memory 253 are sorted in order of descending times with the entity having the smallest finishing time being first. Additionally, the controller 22 stores entities 12 having arriving times $s_i$ less than or equal to virtual time in the order of descending finishing times with the entity 12 having the smallest finishing time being first. Preferably, there is a second finishing time memory 255 which stores the corresponding finishing times $f_i$ of the entities having arriving times stored in the starting time memory 255. Controller 22 preferably takes the arriving time $s_i$ of an entity 12 in the starting time memory 251 and the corresponding finishing time $f_i$ from the second finishing time memory 255 when the entity's starting time $s_i$ becomes less than or equal to virtual time and sorts and stores the finishing time $f_i$ of the entity 12 in the finishing time memory 255 corresponding to its finishing time.

The controller 22 preferably provides service from the server 14 to the entity 12 having the smallest finishing time in the finishing time memory 253. The controller 22 causes the virtual clock 20 to increase virtual time. Preferably, the controller 22 causes the virtual clock to increase virtual time a unit of virtual time after a predetermined period of time. The controller 22 causes the virtual clock to increase virtual time a unit of virtual time after the server 14 provides service to an entity 12, or to increase virtual time to equal virtual time of the entity 12 having the earliest time in the starting time memory 251.

The present invention pertains to a scheduler 10 for controlling when N entities 12, where N is an integer greater than or equal to one, are operated upon by a server 14, as shown in FIG. 24. The scheduler 10 comprises a starting time memory 251 having arriving times $s_i$ of the N entities and the identity of at least the entity 12 having the earliest arriving time, where I is greater than or equal to one and less than N and is an integer and $s_i$ corresponds to the time the i'th entity 12 first requests service from the server 14. The scheduler 10 is also comprised of a finishing time memory 253 having finishing times $f_i$ of the N entities 12 and the identity of at least the entity 12 having the earliest finishing time, where $f_i$ corresponds to the time the i'th entity 12 is to be operated upon by the server 14. The scheduler 10 comprises a virtual clock 20 that keeps track of virtual time so the arriving times $s_i$ and finishing times $f_i$ can be identified. The scheduler 10 is comprised of a controller 22 for choosing entities 12 to be operated upon by the server 14 from the finishing time memory and which have arriving times $s_i$ less than or equal to the virtual time. The controller 22 is connected to the starting time memory 251, finishing time memory 253, and virtual clock 20. By maintaining the identities of the earliest arriving and finishing times, it is not necessary to use a second finishing time.

The controller 22 preferably provides service from the server 14 to the entity 12 having the smallest finishing time in the finishing time memory 253 and which has an arriving time less than or equal to virtual time. The controller 42 preferably causes the virtual clock 20 to increase virtual time. Preferably, the controller 22 causes the virtual clock 20 to increase virtual time a unit of virtual time after a predetermined period of time. Alternatively, the controller 22 causes the virtual clock 40 to increase virtual time a unit of virtual time after the server 14 provides service to an entity 12, or to increase virtual time to equal virtual time of the entity 12 having the earliest time in the starting time memory 253.

Figure 25:
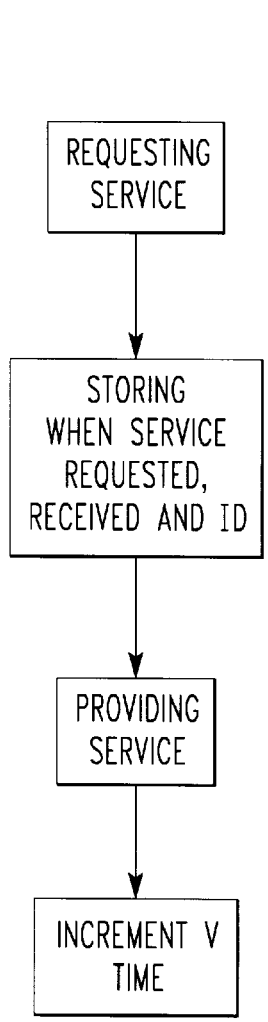
FIG. 25 is a flow chart.

Referring to FIGS. 24 and 25, the present invention pertains to a method of scheduling when a server 14 provides service to entities 12. The method comprises the steps of requesting service from the server 14 by N entities 12, where N is greater than or equal to one and is an integer. Next, there is the step of storing when each of the n entities 12 first requests service from the server 14, the identity of each of the n entities 12 which request service from the server 14 and when each of the N entities 12 is to have received service from the server 14. Then, there is the step of providing an entity 12 of the entities 12 service which has the earliest receiving time and a request time which is less than or equal to virtual time. Next, there is the step of incrementing virtual time by one unit of virtual time after a predetermined time.

Preferably, after the providing step, there is the step of repeating the providing step in regard to other entities 12 who have requested service from the server 14. After the providing step, there is preferably the step of incrementing virtual time. The incrementing step preferably includes the step of incrementing virtual time one unit of virtual time after a predetermined time. Alternatively, the incrementing step includes the step of incrementing virtual time one unit of virtual time after the server 14 provides service to an entity 12, or increasing virtual time to equal the smallest virtual time of in entity 12 which requested service from the server 14.

Figure 26:
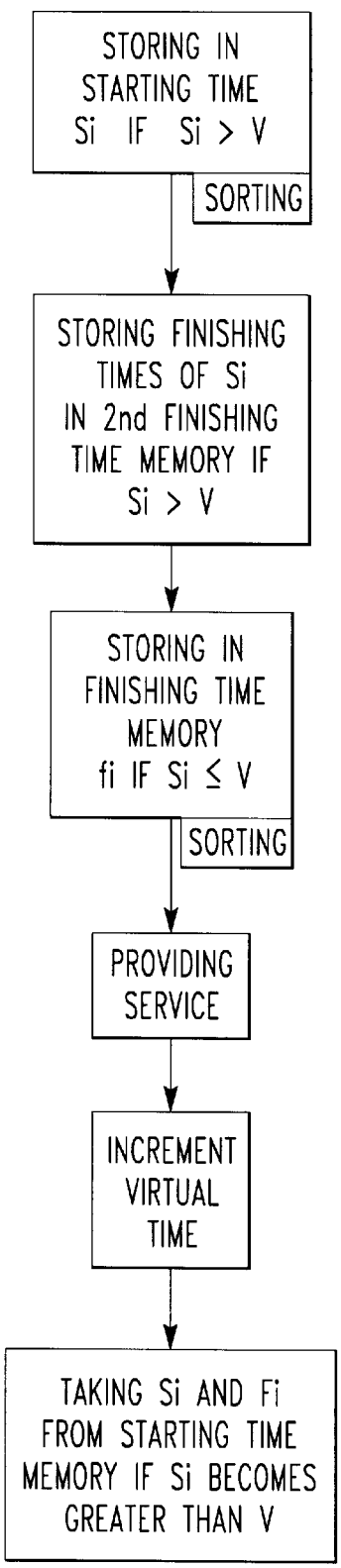
FIG. 26 is a flow chart.

Referring to FIGS. 24 and 26, the present invention pertains to a method for controlling when N entities 12, where N is greater than or equal to one and is an integer, are operated upon by the server 14. The method comprises the steps of storing in a starting time memory 251 arriving times $s_i$ of the N entities which are greater than virtual time, where I is greater than or equal to one and less than N and is an integer, and $s_i$ corresponds to the time the i'th entity first requests service from the server 14. Next there is the step of storing in a finishing time memory 253 finishing times $f_i$ of the N entities whose arriving times $s_i$ are less than or equal to virtual time. Next, there is the step of providing service from the server 14 to an entity 12 having a finishing time $f_i$ in the finishing time memory 253.

Preferably, the step of storing in a starting time memory 251 includes the step of sorting the arriving times $s_i$ of entities 12 in the starting line memory 251 in order of descending times with the entity 12 having the smallest arriving time being first. The step of storing in a finishing time memory 253 preferably includes the step of sorting the finishing times $f_i$ in the finishing time memory 253 in order of descending finishing times with the entity 12 having the smallest finishing $f_i$ being first. Preferably after the step of storing in a starting time memory 251, there is the step of storing in a second finishing time memory 255 corresponding finishing times $f_i$ of the entities having arriving times stored in the starting time memory 251.

After the step of storing in the second finishing time memory 255, there are preferably the steps of taking the arriving time $s_i$ of an entity 12 in the starting time memory 251 and the corresponding finishing time $f_i$ from the second finishing time memory 253 when the entity's starting time $s_i$ becomes less than or equal to virtual time, sorting the finishing time $f_i$ from the second finishing time memory 255 with the finishing times $f_i$ in the finishing time memory 253, and storing the finishing time $f_i$ from the second finishing time memory 255 in the finishing time memory 253. The providing step preferably includes the step of providing service from the server 14 to the entity 12 whose finishing time $f_i$ has the smallest finishing time in the finishing time memory 253. After the providing service step, there is preferably the step of increasing virtual time. The increasing step preferably includes the step of increasing virtual time a unit of virtual time after a predetermined period of time. Alternatively, the increasing step preferably includes the step of increasing virtual time a unit of virtual time after the server 14 provides service to an entity 12, or increasing virtual time to equal virtual time of the entity 12 having the earliest time in the starting time memory 251.

The following algorithms carry out the sorting, enqueuing nd dequeing in regard to finishing times $f_i$, starting times si and sorting when the starting time is less than V or greater than V.

f(1)=
if N=1 then
f(I)=Si
else
f(I)=max (V, Si+1/wi)
to transfer si when si>V
while
   [head (s)≦V
   id=head(s)
   enqueue (F)←(ID, $F_{ID}$)
   dequeue_head(s)]
In regard to the finishing time queue
$T_{mp}=F_k$
$S^i_k$=max (tmp, V(t)
$F^i_k=S^i_k+L_k/W_k$ $$\sum_1^N (f_1(i) - v) \cdot Wi = 0 \quad (4)$$

and

Figure 27:
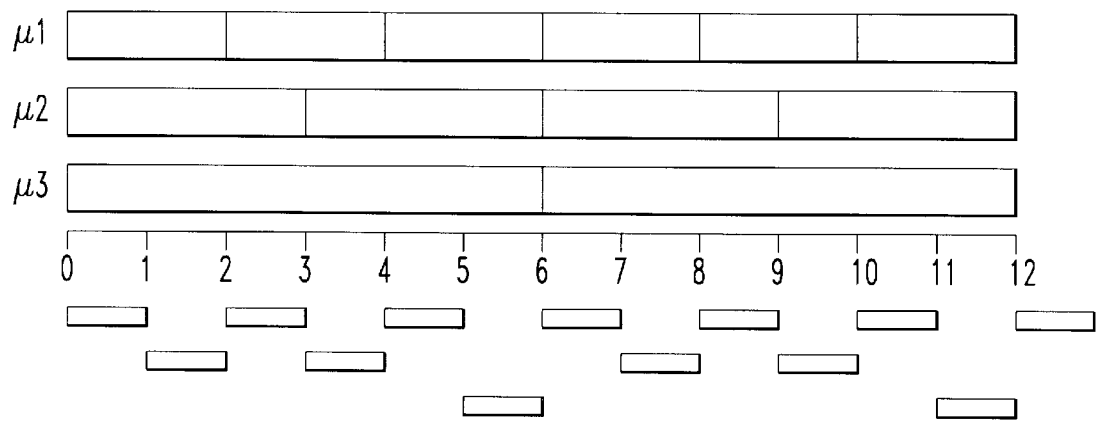
FIG. 27 is a diagram of a flow model of an example involving equation 4.

As a simple example in regard to equation (4) and how it is used and with reference to FIG. 27, let $W_1$=½, $W_2$=⅓ and $W_3$=⅙. As a first guess, let V=0.

Then, equation (4) yields (2−0)·½+(0−0)·⅓+(0+0)=1. Since equation (4) yields 1 and not 0 in this instance, then V=0 is not correct. Instead, let V=2, then (2−2)·½+(0−2)·⅓+(0−2)·⅙=−1. Since equation (4) yields −1 and not 0, then V=2 is not correct. Instead, let V=1, then (2−1)·½+(0−1)·⅓+(0−1)·⅙=0 which is the desired result.

The basic premise of the service policy used by Weighted Fair Queuing and PGPS is to provide service to the packet which would be the first packet to finish in the fluid-flow fair queueing (FFQ) model. This service policy is known as First Finisher First Served (FFFS) and it is used as one of the service policies of this invention. If a PFQ system with unconstrained sessions is considered, or leaky bucket constrained sessions with very large buckets, this service policy may result in a large discrepancy between the service that a session receives in the FFQ system and the service it would have received in the FFQ system.

Figure 28:
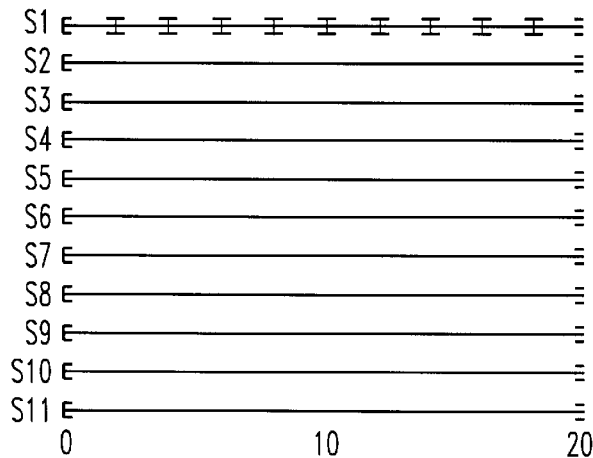
FIG. 28 a graph depicted fluid-flow fair queueing.
Figure 29:
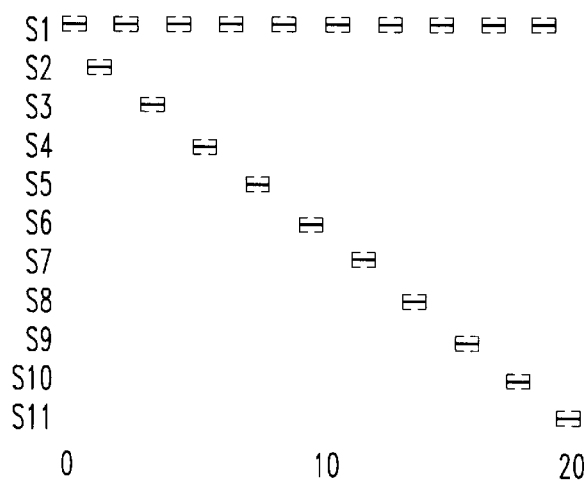
FIG. 29 is a graph showing packet fair queueing, session 1 constrained.

For a given server with 11 sessions with guaranteed service rates of $r_1$=0.5,$r_k$=,05m 2≦k≦11, if sessions 2, . . . , 11 are leaky bucket constrained to a rate of 0.05 and session 1 is constrained to a rate of 0.5, then the service patterns in a FFQ and PFQ system would be as shown in FIGS. 28 and 29. All sessions send packets of length 1. Assume a length of 1 packets in all of the simulations presented so that the examples herein are not overly complicated. This should not be considered to reduce the importance of any of these simulation results as this is an accurate picture of future integrated services networks built on top of Asynchronous Transfer Mode (ATM) equipment.

Figure 30:
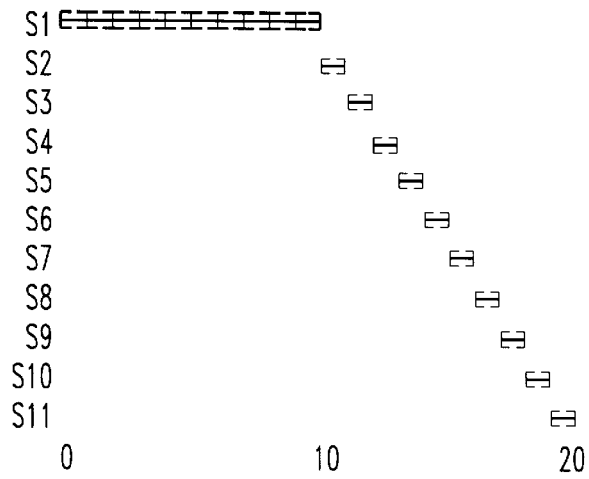
FIG. 30 is a graph of packet fair queueing, session 1 unconstrained.

In FIGS. 28, 29 and 30 a "[" marks the time at which a packet begins service and a marks the point at which it finishes being serviced. In the fluid model the server can transmit many packets simultaneously while in the packet model only one packet may be serviced at a time. As a result in the FFQ model the service intervals of packets belonging to multiple sessions may overlap, while in the packet model they may not. FIG. 30 shows what happens if session 1 is not constrained or has a very deep leaky bucket and sends packets into the server at a rate much greater than its guaranteed service rate. In a Fluid-Flow Fair Queueing system such behavior would not result in session 1 receiving any additional service during any subinterval of the busy period. This property of isolation whereby a misbehaving session cannot increase the service it receives at the expense of other sessions is one of fair queueing's highly valued properties. That the resulting service is smooth is very valuable for feedback flow control schemes in which sessions try to measure their bottleneck service rate [L. Clark, D. Lambert, M. Zhang. NETBLT: A high throughput transport protocol. In Frontiers in *Computer Communications Technology: Proceedings of the ACM-SIGCOMM '87*, pages 353–359, Stowe, Vt., August 1987. Association for Computing Machinery; S. Shenker A theoretical analysis of feedback flow control. In *Proc. ACM SIGCOMM '90; (Special Issue Computer Communication Review)*, pages 156–165, September 1990. Published as *Proc. ACM SIGCOMM '90;* (Special Issue Computer Communication Review), volume 20, number 4; S. Keshav, A. Agrawala, and S. Singh. Design and analysis of a flow control algorithm for a network of rate allocating servers. In *Proc. Second IFIP WG6.1/WG6.4 Intl. Workshop on Protocols for High-Speed Networks*, Palo Alto, Calif., November 1990]. If the transmission rate of session 1 is not constrained under a packet fair queueing odel session 1 will increase the amount of service it receives during the first half of the busy period resulting n the service pattern shown in FIG. 30. Under the unweighted version of fair queueing, for each session there is a limit on the difference between he number of hits transmitted by the bit-by-bit algorithm and the packet-by-packet algorithm, Greenberg and Madras [A. Greenberg and N. Madras. Comparison of a fair queueing discipline to processor sharing. *Proceedings of Performance*, 1990] prove that this emulation discrepancy bound is never greater than the maximum packet size. Under weighted fair queueing with FEES service this discrepancy may be much larger. If this is undesirable, then a different service policy is required.

A policy which prevents sessions that transmit packets faster than they would have been serviced in the fluid model, from receiving additional service will serve to limit the emulation discrepancy. To implement such a policy it is only necessary to restrict any packet from starting service in the packet system before the time it would have started service in a corresponding fluid-flow reference system. This policy is only meaningful in the context of a packetized service model since in a fluid environment it would be equivalent to FFFS.

The implementation of this policy is as follows, when the server finishes serving a packet the next packet to be serviced is the packet with the smallest finishing time among those packets whose starting time is less than or equal to the value of V(t). If a packet is called eligible for service when its starting time is less than virtual time then this service is referred to as First Eligible-Finisher First Served (PLUS).

A possible concern with this service policy is that, since service is being restricted to those packets whose starting time is less than or equal to V(t), if the starting times of all packets were greater than V(t) then this would not be a work-conserving discipline. As shown below, one property of this computation of V(t) is that it ensures that a FEFS server is work conserving at all times.

The method of computing of V(t) is very different from that given by Parekh in a number of respects. The most important difference is that the progress in the real system is used to compute V(t). This relieves the need to maintain a fluid-flow reference model for the purpose of computing V(t). In addition to the system virtual time V(t), each session has its own virtual time $V_k(t)$, which is the sum, over the interval [0, t], of the normalized service received by the session plus the normalized service missed by the session. If $l_k(t)$ is the number of the last packet for session k served by time t, then $V_k(t) \approx \hat{V}_k(t)$ where $\hat{V}_k(t)$ is defined below as $$\hat{V}_k(t) = S_k^{l_k(t)+1} \tag{5}$$

The value of V(t) in a VSQ system is defined as that value which satisfies the equality.

$$\sum_{k \in K} (V_k(t) - V(t)) \cdot \tau_k = 0 \tag{6}$$

This computation of virtual lime based on the service received by all sessions is the origin of the name of our service discipline.

A server with an FEFS service policy which uses the solution to (6) as the value of virtual time in the system is always work conserving. And that if $S_{min}(t)$ is the smallest starting time among all packets in the system at time t, then $V(t) > S_{min}(t)$. A simpler algorithm for computing V(t) which tries to approximate our ideal computation.

$$V(t+\tau) = \max\left( V(t) + \frac{C \cdot \tau}{\sum_{k \in K} \tau_k}, S_{min}(t+\tau) \right) \tag{7}$$

Since V(t) is specifically found to always be greater than or equal to the starting time of at least one session, if any packets are waiting in the system at least one is always eligible thus the approximation is work-conserving even under a FEFS service policy.

Given that Self-Clocked Fair Queueing is simpler to implement than Virtual Service Queueing, if SFQ provided service guarantees equivalent to VSQ there would be little reason to implement VSQ.

Assume a server serving 1001 different sessions with service rates of $r_1=0.5$, $r_k=0.0005, 2 \leq k \leq 1001$ if all sessions send packets of length 1 then these correspond to service intervals of 2 and 2000 respectively. If all sessions become active at the start of the server busy period and thereafter packets (all of size 1) arrive from each session at their service rate then initially $$\begin{aligned} t &= 0 \\ &\phantom{=} 6 \\ V(0) &= 0 \\ F_1^0 &= 2 \\ F_i^0 &= 2000, 2 \leq i \leq 1001 \end{aligned}$$

all sessions have one packet enqueued and a packet from sessions 1 starts service at t=1 the first session 1 packet finishes service and the value of virtual time will be
ti $V(1)=F_1^0=2$ in fact V(t)=2 from the moment that the session 1 packet started service, but in general only the value of V(t) at the times when packets arrive or finish service is of concern. Since all sessions but session 1 have a packet enqueued the first packet from some session I∈K\1 will start service, at t=2 the session I packet will finish service at which point $$V(2)=F_i^0=2000$$

also at this time the second packet from session 1 will arrive and be assigned a finishing time of $$F_1^1 = \frac{1}{r_1} + \max(F_1^0, V(a_1^1)) = 2 + \max(2, 2000) = 2002$$

since $\forall k \in K\dagger 1 | F^1_1 > F^0_k$ a packet from some session j∈K†1, I will start service, at t=3 the session j packet will finish service at which point $$V(3)=F_j^0=2000$$

and a packet from some session k∈K\1,i,j will start service, at t=4 the session k packet will finish service at which point $$V(4)=F_k^0=2000$$

also at timer t=4 and the third packet from session 1 will arrive and be assigned a finishing time of $$F_1^2 = \frac{1}{r_1} + \max(F_1^1, V(a_1^2)) = 2 + \max(2002, 2000) = 2004$$

and a packet from some 1∈K\1,i,j,k will start service, etc . . .

Figure 31:
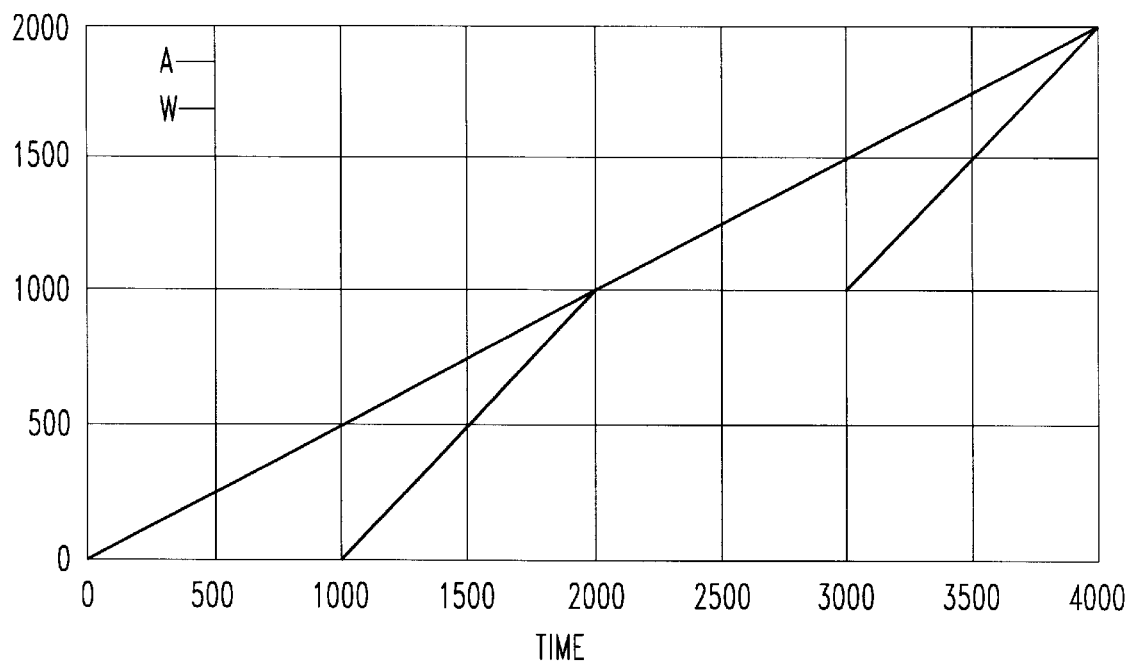
FIG. 31 is a graph of session 1 packet arrivals and work received.

FIG. 31 shows the pattern of packet arrivals (A) and departures (W) for session 1 which is the same at the queue depth under these conditions. Thus session 1 will wait until t=1001 before it will be serviced at which point it will have built up a queue of 500 packets. Now the server will service session 1 continuously for the next 1000 packets, during the transmission of the 500 packets enqueued at time 1002,250 more packets will arrive during the transmission of those 250 packets 125 will arrive . . . etc . . . this will repeat with the arrival of the second packet for all sessions in K\1. So the transmission of session 1's packets by the server will come in bursts of 1000 at a time. Thus we see that the first packet of each such burst will experience a 1000 unit delay in transmission.

The example shown in FIG. 31 may appear too contrived to be a cause for concern due to the statistically unlikely simultaneous arrival of packets from 1000 sessions or the fact that a switch with a 1000-to-1 multiplexing capability is required. However statistical arguments are not appropriate if the intended use of a WFQ server is to provide guaranteed service. And since interest has been expressed in building switching systems with very high port counts it should not be assumed that the multiplexing factor will always be low.

However, even at a server with only a 2-to-1 multiplexing factor the delay experienced by a session may still be large. The delay experienced by session 1 as the multiplexing capacity of the server is slowly increased quickly approaches the delay experienced with infinite multiplexing.

Figure 32:
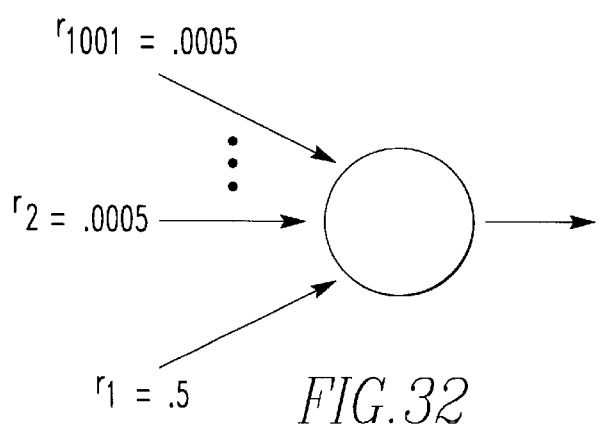
FIG. 32 is a schematic representation of a topology used for FIG. 31.

In FIG. 32 the same system is shown but for comparison the service received by session 1 under 4 different scenarios is shown. In each scenario the times are staggered at which the other sessions start transmitting packets. The curves labelled Wi, I=1,2,3,4 represent the service received by session 1 in the $i^{th}$ scenario. In scenario I the time at which session k, $2 \leq k \leq$, starts transmitting is [k/I]. What this says is that in scenario 1, the session 1 packet stream enters a 2-to-1 multiplexing server at the same time as a train of 1000 packets, one from each of the 1000 other sessions. In scenario 2, the session 1 packet stream enters a 3-to-1 multiplexing server at the same time as a two trains of 500 packets, one of the trains contains one packet from sessions [2, . . . ,501] the other contains one packet from sessions [2, . . . ,501]. Scenarios 3 and 4 involve similar arrivals at servers with multiplexing factors of 3-to-1 and 4-to-1, respectively. We will see that even in servers with very low multiplexing factors session 1 may still experience very large delays in service. In FIG. 32 the number of session 1 packets which have arrived at a given time is labelled (A). In these scenarios there should be no visible difference between the packet arrivals and their departures, represented by the curves of work received. The curve labelled (W) is the work received by session 1 at a given time, from a server with a 1001-to-1 multiplexing factor, which lags the packet arrivals by as many as 500 packets at times 1000 and 3000. The lag between packet arrivals and work received is explicitly shown in FIG. 33, which clearly shows the worst service lag during the interval for each scenario.

Figure 33:
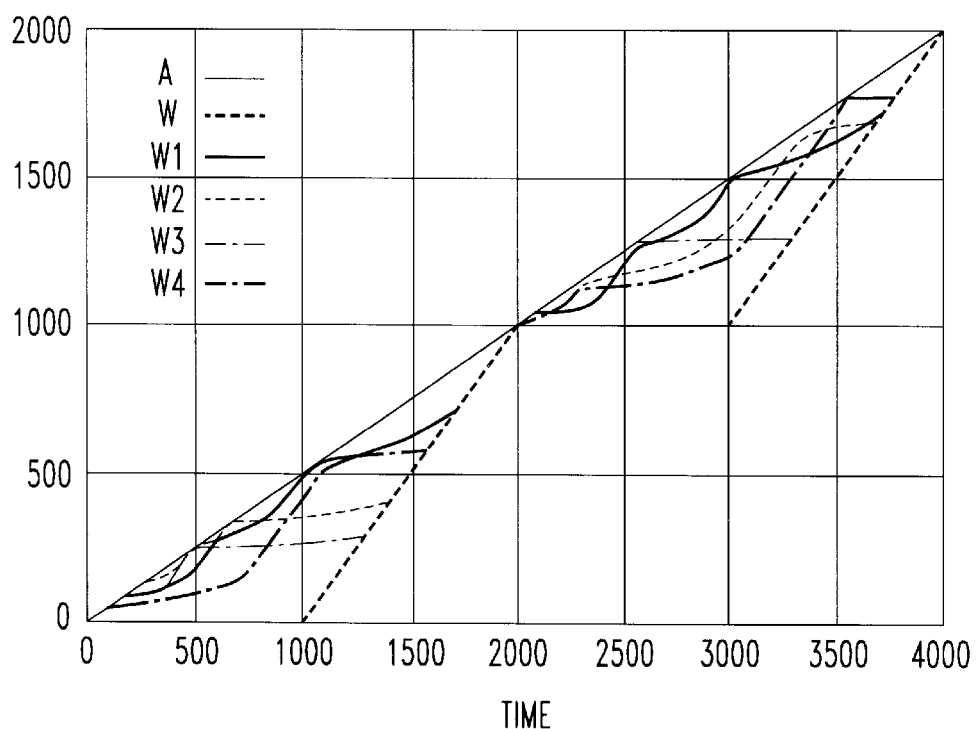
Figure 33 is a graph of packets transmitted vs. time for session 1.
Figure 34:
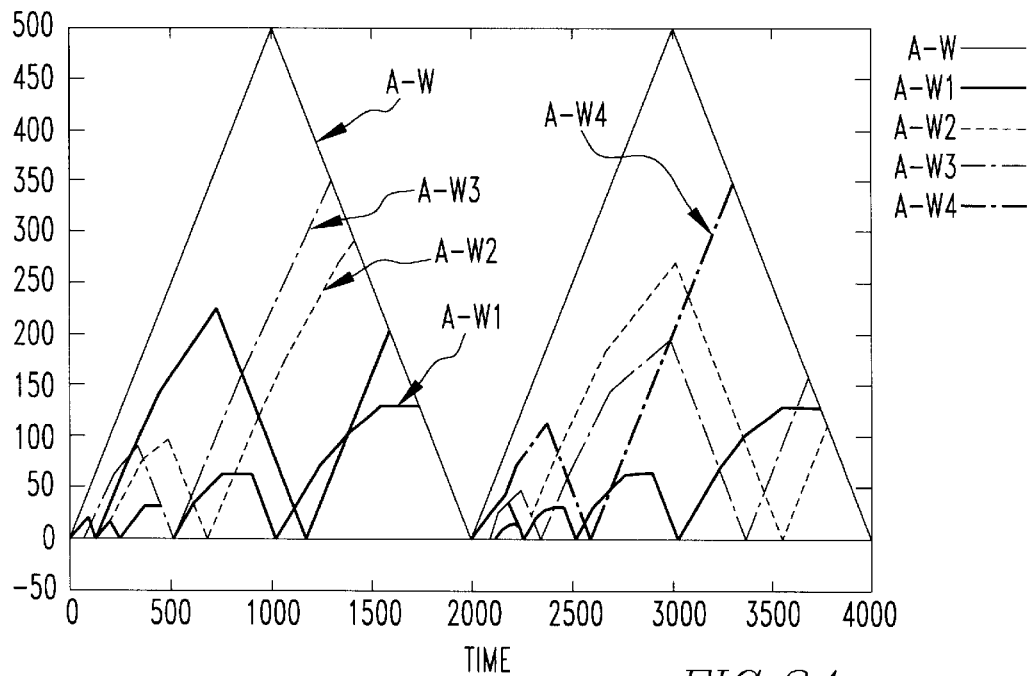
FIG. 34 is a graph of queue depth vs. time for session 1.
Figure 35:
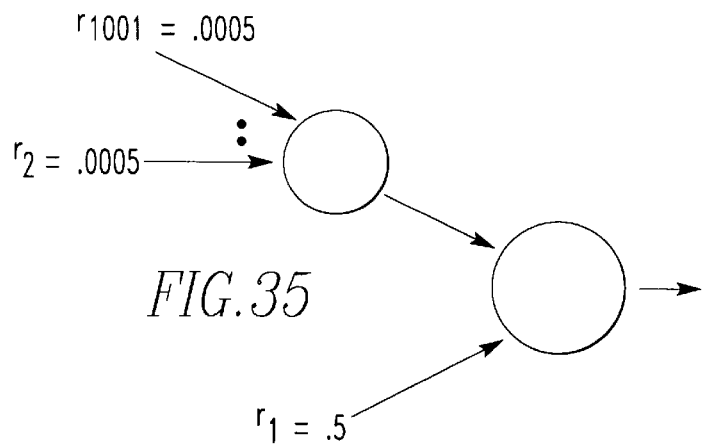
FIG. 35 is a schematic representation of a topology used for scenario 1 in FIG. 34.
Figure 36:
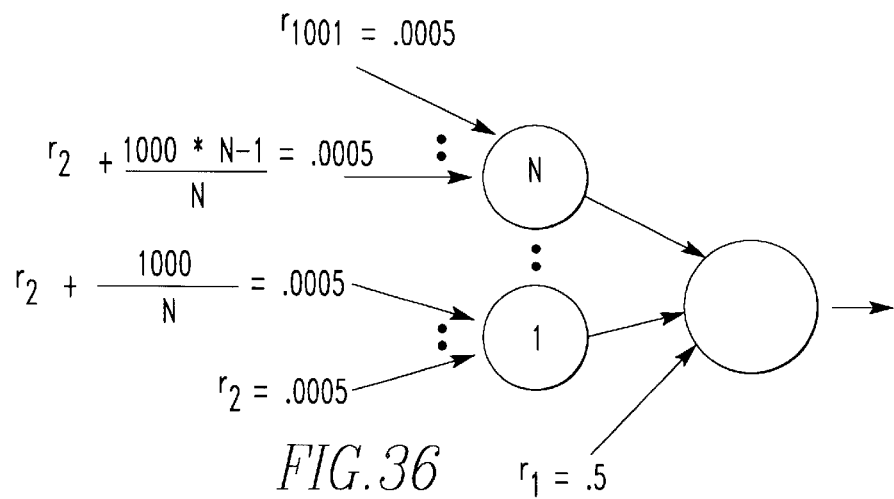
FIG. 36 is a schematic representation of a topology for scenarios 2, 3 and 4 in FIG. 34.
Figure 37:
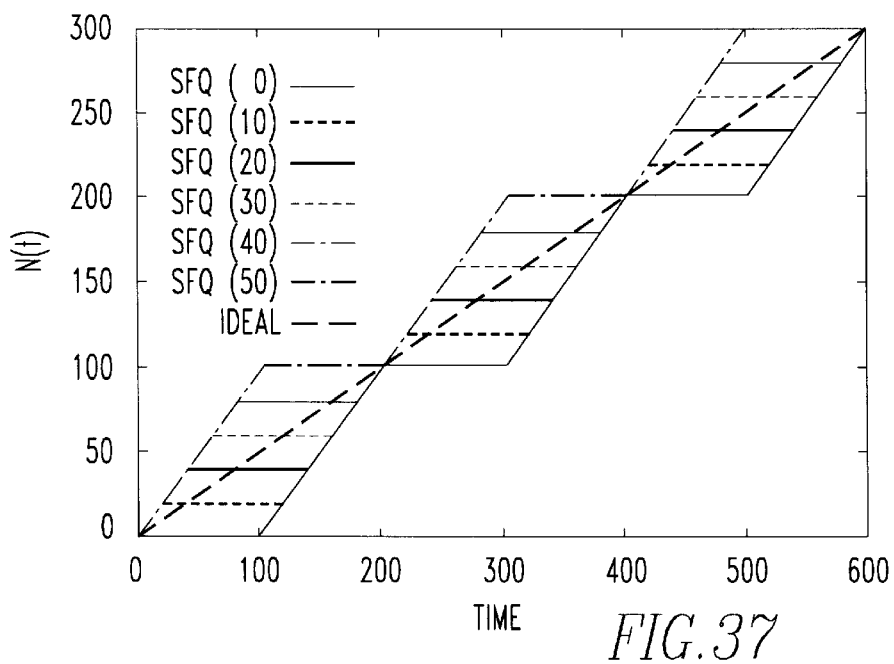
FIG. 37 is a graph of work W(t) received by session 1 over time for different initial token bucket depths.

FIG. 33 shows the depth of session 1's queue, which is a result of any difference between the packet arrivals (A) and work received (W) under the different scenarios. While the A-W curve requires the simultaneous arrival of packets by the slower sessions, this requirement does not exist for the A-Wi curves. If the first level servers in FIG. 35, labelled 1, . . . ,N, implement fair queueing or even just round-robin service then they can easily generate the packet trains we described above.

In addition to seeing the possible service delays that session 1 may experience there is another observation worth noting. In the first example while it is clear that initially V(t) grows too quickly, what may not be apparent is that even the long term average rate of growth of V(t) is too large. To a great extent the cause of both the service lag of session 1 and the accelerated growth of V(t) is due to the fact that while the busy periods of a FFQ system and a PFQ system are identical, the session 1 backlog periods are not. In particular, while in the FFQ system session 1 is backlogged during the entire busy period it is frequently not backlogged in the PFQ system. To further observe the effect of this in the next two figures a system very similar to that in FIG. 31 is considered except to simplify the figures session 1 shares the server with 100 other connections each with a rate of 0.005. The second figure shows the growth of V(t). Additionally each figure has several curves labeled sfq (N), where N is the depth of session 1's leaky bucket which is burst into the server at time 0.

If all the scenarios presented using a server which implements VSQ are run, in any of its four combinations described above, no session 1 packet ever departs later than its expected finishing time. It has been demonstrated, that under some simple scenarios VSQ can provide much stronger service guarantees then SFQ. The foundation which motivates the implementation of VSQ is the following. Let I(t) be the largest set of times of size N, $0=t_1<t_2< \ldots <t_N=t$ which satisfy the following requirement, $\forall j, j\epsilon[1, N-2]$ $$\forall x: 0 \leq x < I_{N-1}(t)|(t_j \leq <t_{j+1}) \rightarrow ((B(x)=B(t_j)) \wedge (B(x) \neq B(t_{j+1}))) \quad (8)$$

if one considers the set of pairs $\{(t_1,t_2), \ldots ,(t_i,t_{i+1}), \ldots (t_{N-1},t_N)\}$ it is seen that these are the N-1 intervals from time 0 to time t during which the set of backlogged sessions remains constant. The primary goal is to model the work performed in the system and to represent it by the value of virtual time V(t). Define $W_k(t)$ as the amount of session k traffic transmitted at time t; and $w_k(t)$ as the weighted amount of traffic of session k transmitted at time t. Unlike in [S. Golestani. A self-clocked fair queueing scheme of broadband applications. Proceedings of *IEEE INFOCOM*, 1994], $W_k(t)$ is defined simply as the actual work performed by the real server on behalf of session k at time t. A definition of $W_k(t_i)$, $t_i \epsilon I(t)$ for a FFQ system is $$W_k(I_1(t))=0 \quad (9)$$

for $I\epsilon[2,N]$ $$W_k(I_i(t)) = \sum_{j=1}^{i-1} \begin{cases} 0 & k \in A(I_j(t)) \\ \dfrac{r_k}{\sum_{j\in B(I_j(t))}} \cdot (I_{j+1}(t) - I_j(t)) \cdot C & k \in B(I_j(t)) \end{cases} \quad (10)$$

Equations (9) and (10) are used to define $W_k(t_i)$, $t_i \leq t$. Let $x(t_i)$ be the largest $j\epsilon[1,N]|I_j(t) \leq t_i$ $$W_k(t_i) = W_k(I_{x(t_i)}(t)) + \dfrac{r_k}{\sum_{j\in B(I_{x(t_i)}(t))}} \cdot (t_i - I_{x(t_i)}(t)) \cdot C \quad (11)$$

From this $w_k(t)$ is defined as $$w_k(t) = \dfrac{1}{r_k} W_k(t) \quad (12)$$

Now define $u_k(t)$ as the missed normalized service of session k at time t, unlike in [S. Golestani. A self-clocked fair queueing scheme of broadband applications. *Proceedings of IEEE INFOCOM,* 1994] $u_k(t)$ is not defined in terms of V(t) so that V(t) can later be defined in terms of $u_k(t)$. First $U_k(t)$ is defined as the missed service of session k at time t as $$U_k(I(t))=0 \quad (13)$$

for $I\epsilon[2,N]$ $$U_k(I_i(t)) = \sum_{j=1}^{i-1} \begin{cases} 0 & k \in B(I_j(t)) \\ \dfrac{r_k}{\sum_{j\in B(I_j(t))}} \cdot (I_{j+1}(t) - I_j(t)) \cdot C & k \in A(I_j(t)) \end{cases} \quad (14)$$

Use (13) and (14) to define $U_k(t_i)$, $t_i \leq t$. Let $x(t_i)$ be the largest $j\epsilon[1,N]|I_j(t) \leq t_i$ $$U_k(t_i) = U_k(I_{x(t_i)}(t)) + \dfrac{r_k}{\sum_{j\in B(I_{x(t_i)}(t))}} \cdot (t_i - I_{x(t_i)}(t)) \cdot C \quad (15)$$

Thus $U_k(t)$ represents the service that session k could have received had it been backlogged during all the intervals that it was absent. From this $u_k(t)$ follows in the same manner as $w_k(t)$ $$u_k(t) = \frac{1}{r_k} U_k(t) \qquad (16)$$

Consider a busy period of the FFQ system, beginning at t=0. The virtual time of the FFQ system, $V_k(t)$, is defined as $$V_k(t) = w_k(t) + u_k(t) \qquad (17)$$

at any time t it is the case that $\forall j, k \in K$ $$w_j(t) = w_k(t) \qquad (18)$$

$$u_j(t) = u_k(t) \qquad (19)$$

$$V_j(t) = V_k(t) \qquad (20)$$

and define V(t) as, $\forall k \in K$ $$V(t) = V_k(t) \qquad (21)$$

Let $P_k(t)$ be the set of session k packets in a PFQ system which are past due, i.e. by time t they would have finished service in an FFQ system but have not finished service in a PFQ system. This is also a subset of all session k packets which are eligible for service at time t. However, the following definition of $P_k(t)$ does not require a FFQ reference model.

$$P_k(t) = \forall i | (F_k^i \leq V(t)) \wedge (d_k^i \leq t) \qquad (22)$$

This represents all the session k packets which ave finishing times earlier than the correct virtual time, that have not finished service.

The precise definition of $V_k(t)$ in a PFQ system which can be computed without using a fluid-flow reference model is:

$$V_k(t) = S_k^{l_k(t)+1} + \sum_{i \in P_k(t)} \min(S_k^{i+1}, V(t)) - F_k^i \qquad (23)$$

an important result of this which will be needed later is that $$V_k(t) \geq S_k^{l_k(t)+1} \qquad (24)$$

It is known that if session k is backlogged in the PFQ system at time t and I is the packet at the head of session k's queue at time t, then $V_k(a^i_k) = S^i_k$ and since packet I is still in the queue at time t session k has received no work in the interval $[a^i_k, t]$. However, session k may have missed work in interval $[a^i_k, t]$. The unpleasant summation in (23) is the sum of session k's missed normalized work in this interval.

Let $\delta_k(t)$ be the normalized service lag of session k at time t.

$$\delta_k(t) = V(t) - V_k(t) \qquad (25)$$

Let $\Delta_k(t)$ be the actual service lag of session k at time t $$\Delta_k(t) = (V(t) - V_k(t)) \cdot r_k \qquad (26)$$

Consider a system with only two sessions, both of whom are continuously busy until time t, at time t if $\Delta^1(t)=1$ then it must be that $\Delta_2(t)=-1$ this is due to the fact that the PFQ server is work conserving and does the same amount of actual work in a given time interval as does the FFQ server thus if one connection has actually received more work under PFQ than it should have under FFQ then the other session must have failed to receive exactly the same amount of actual work in the PFQ system, or another way to put it would be that it must be that $\Delta_1(t)+\Delta_2(t)=0$. For a system of arbitrarily many sessions $$\sum_{k \in K} \Delta_k(t) = 0 \qquad (27)$$

In other words, the sum of the actual service lags must be 0. This is the same claim that was made in (3), which is now restated. The value of V(t) is the solution to the equality $$\sum_{k \in K} (V_k(t) - V(t)) \cdot r_k = 0 \qquad (28)$$

If the computation of V(t) in (1) is recalled $$V(0) = 0$$

$$V(t_{j-1} + \tau) = V(t_{j-1}) + \frac{\tau}{\sum_{i \in B(t_j)} r_i}, \qquad (29)$$

$$\tau \leq t_j - t_{j-1}, j = 2,3,\ldots$$

a key point to note is that unlike this method of computing V(t) from an earlier value of V in the method just presented the computation of V(t) at a given time may be correctly performed without the knowledge of any previous values of V(t). As a result, the computation need not be performed each time there is an event in the fluid-flow system, but instead may be computed at arbitrary intervals.

Proof of Work Conservation

Lemma 1 $\forall k, k \in A(t) | S_k^{l_k(t)+1} \geq V(t)$ from the definitions of $l_k(t)$ and
$S_k^i k \in A(t) \to a_k^{l_k(t)+1} \geq V(t)$ (30)

Theorem 1

A server with an FEFS service policy which uses the solution to (28) as the value of virtual time in the system is always work conserving.

Proof

First, it needs to be proven that during a busy period there is always at least one eligible packet in the system. A byproduct of the definition of $l_k(t)$ is that if session k has no packets waiting in the PFQ system then $S_k^{l_k(t)} \geq V(t)$. If rewrite (28) as $$\sum_{k \in B} (V_k(t) - V(t)) \cdot r_k + \sum_{k \in A} (V_k(t) - V(t)) \cdot r_k = 0 \qquad (31)$$

It can be seen that from Lemma 1 and (23) that $$\sum_{k \in A} (V_k(t) - V_k(t)) \geq 0 \qquad (32)$$

as a result, it must be that $$\sum_{k \in B} (V_k(t) - V(t)) \leq 0 \qquad (33)$$

this implies that $$\exists k, k \in B | (V_k(t) \leq V(t)) \qquad (34)$$

from (24)

$$\exists k, k \in B | (S_k^{l_k(t)+1} \leq V(t)) \qquad (35)$$

thus there is at least one packet eligible for transmission, hence the system is work-conserving under a FEFS service policy.

Both [S. Golestani. A self-clocked fair queueing scheme of broadband applications. *Proceedings of IEEE INFOCOM,* 1994] and [Abhay Kumar J. Parekh. A Generalized Processor Sharing Approach for Flow Control in Integrated Services Networks. PhD thesis, Massachusetts Institute of Technology, Boston, Mass., February 1992] observe that the slope of V(t) is $$\frac{dV(t)}{dt} = C \cdot \left( \sum_{k \in B(t)} r_k \right)^{-1} \quad (36)$$

and [S. Golestani. A self-clocked fair queueing scheme of broadband applications. *Proceedings of IEEE INFOCOM*, 1994] notes that during a busy period V(t) is a monotonically increasing function with time. The statement will now be made stronger Lemma 2

For any system where $$\sum_{k \in K} r_k < \infty \quad (37)$$

$$r_k > 0, k \in K \quad (38)$$

$$C > 0 \quad (39)$$

During any server busy period the function V(t) is strictly monotonically increasing with time.

Proof

If the server is busy at time t then $$B(t) \neq 0 \quad (40)$$

$$Z = \frac{C}{\sum_{k \in B(t)} r_k} \quad (41)$$

from (40, 38, 53, 37, 39)

$$0 < Z < \infty \quad (42)$$

substituting (41) in (36)

$$\frac{dV(t)}{dt} = Z \quad (43)$$

from (42)

$$\frac{dV(t)}{dt} = Z > 0 \quad (44)$$

$$(45)$$

Thus during any server busy period V(t) is a strictly monotonically increasing function, with a slope ≧ Z Note: this is similar to the observation in [Alan Demers, Srinivasan Keshav, and Scott Shenker. Analysis and simulation of a fair queueing algorithm. In *Proc. ACM SIG-COMM '89*, pages 1–12, Austin, Tex., September 1989] that the mund number R(t) which is represents the number of rounds performed by a round-robin server by time t, is also strictly monotonically increasing. Generally, V(t)≠R(t) however philosophically they express very similar concepts.

From an implementation point of view this means that given two times $t_1$, $t_2$ s.t. $t_2 \geq t_2$ $$V(t_2) \geq V(t_1) + Z \cdot (t_2 - t_1) \quad (46)$$

In a system with C=1 and $\Sigma_{k \in K} r_k <= c = 1$ this is $$V(t_2) \geq V(t_1) + (t_2 - t_1) \quad (47)$$

This is the origin of the first value in the max function in (27).

As was mentioned above, there cannot exist a solution to (28) in which V(t) is smaller than the starting times of all sessions. This provides the second value of the max function in (7).

Unlike SFQ an implementation of VSQ requires 2 sorted queues, one of finishing times and a second for starting times plus the capability to remove an element other than the one at the head of the queue. A sequencer chip described in [H. Jonathan Chao. A vlsi sequencer chip for atm traffic shaper and queue manager. *IEEE Journal of Solid-State Circuits*, 27(11):1634–1643, November 1992] could be modified to provide this capability, thus allowing for its use in high speed networks.

Unlike the formulation of virtual time in (4) given by Parekh, the computation presented in (28) does not include any reference to the value of virtual time at some point in the past. This property is now used to give a hybrid algorithm for computing V(t). It is clear that one can construct many variations on this theme, due to the number of possible engineering tradeoffs arising from different implementations. This simple example will be sufficient to illustrate what is possible.

Suppose that given all the session information at any time t it is possible to have computed the value of V(t) by time t+X, in which case a snapshot will have been taken of the system state at X unit intervals $x_0, x_1, \ldots$ and over the course of the interval the value V will be computed which it should have had at the beginning of the interval.

Let $V_i$ equal the value of V(t) in (28) at the beginning of the $i^{th}$ interval as $V_i$, so $V_i = V(x_i) = V(Xi)$. Let $\hat{V}_i = X(I+1)$. So $V_i$ will be computed during the period [Xi, X(I+1)] which is the same as $[\hat{V}_{i-1}, \hat{V}_i]$. If $[\hat{V}_{i-1}, \hat{V}_i]$ is a busy period then virtual time in the system must have increased by at least $$\frac{(\hat{V}_i - \hat{V}_{i-1}) \cdot C}{\Sigma_{k \in K}^{r_k}} \quad (48)$$

So at time $\hat{V}_i$ it can be concluded that $$V(\hat{V}_i) \geq V_i + \frac{(\hat{V}_i - \hat{V}_{i-1}) \cdot C}{\Sigma_{k \in K}^{r_k}} \quad (49)$$

So any time $t_{j+1}$, $\hat{V}_i \leq t_{j+1} \geq \hat{V}_{i+1} V(t_{j+1})$ is computed as $$V(t_{j+1}) = \quad (50)$$

$$\max \left( V_i + \frac{(t_{j+1} - \hat{V}_{i-1}) \cdot C}{\Sigma_{k \in K}^{r_k}}, V(t_j) + \frac{(t_{j+1} - t_j) \cdot C}{\Sigma_{k \in K}^{r_k}}, S_{min}(t_{j+1}) \right)$$

In this example, it is assumed that the computation of $V_i$ always took X units of time. If the computation of $V_i$ took varying amounts of time, rather than starting the computation of $V_{i+1}$ at time Xi+1 it could be done as soon as the computation of $V_i$ finished. Given the definition of $\hat{V}_i$, (50) is defined for this method as well. Additionally if an iterative computation of $V_i$ is used, then the current lowest estimate can also be used even before the final computation is completed.

Figure 38:
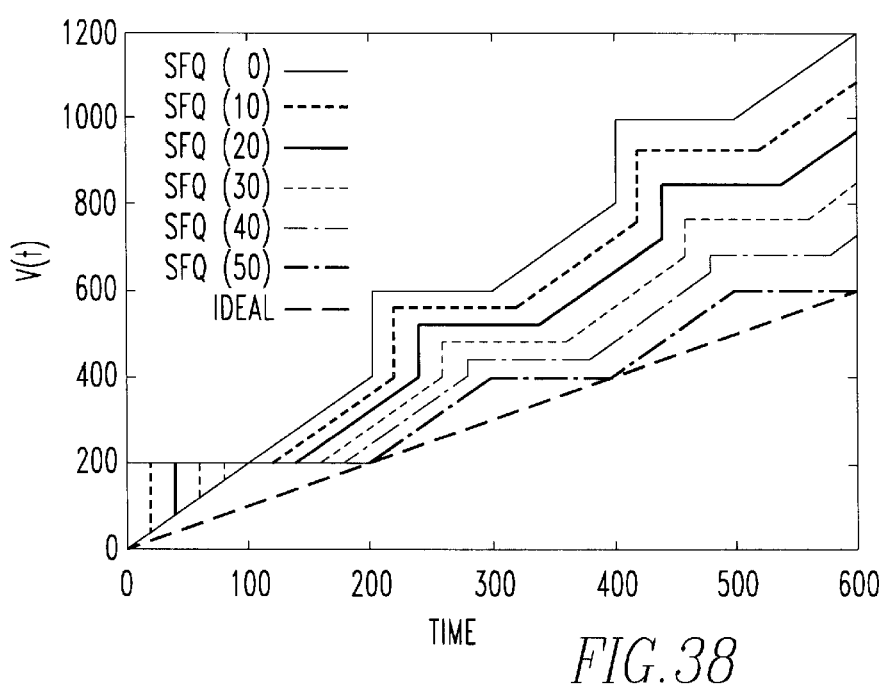
FIG. 38 is a graph of growth of V(t) over time for different initial depths of session 1's token bucket.
Figure 39:
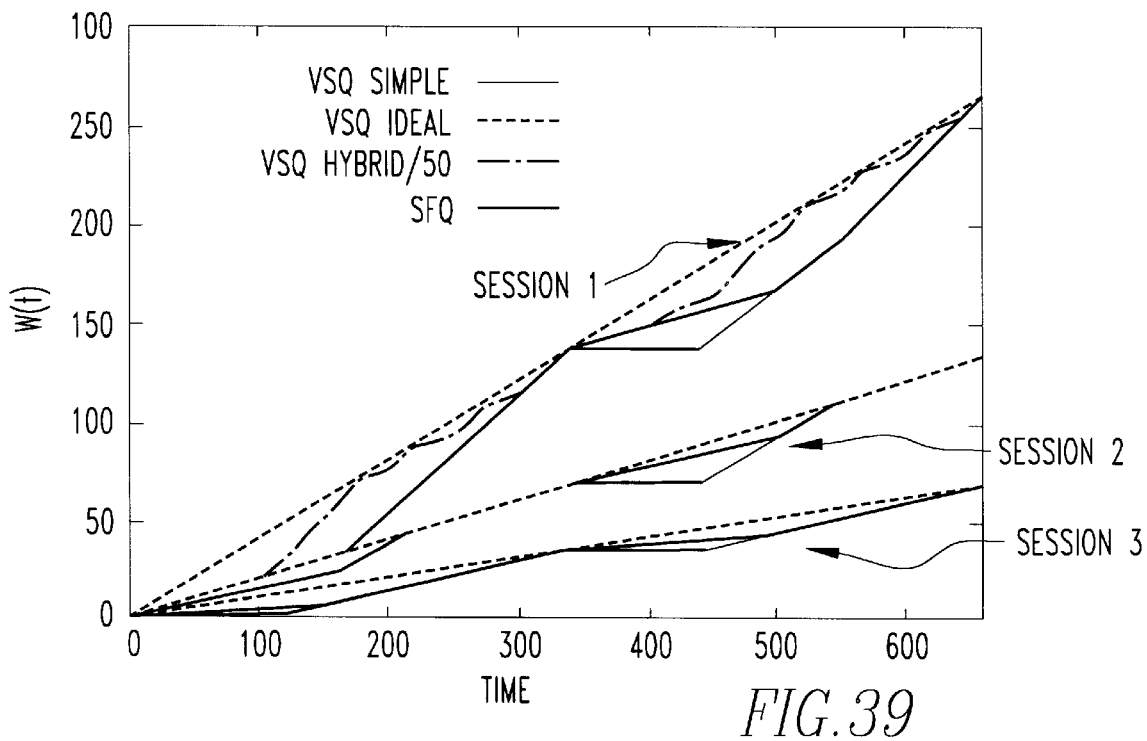
FIG. 39 is a graph of service received by sessions 1, 2 and 3 under different service disciplines.
Figure 40:
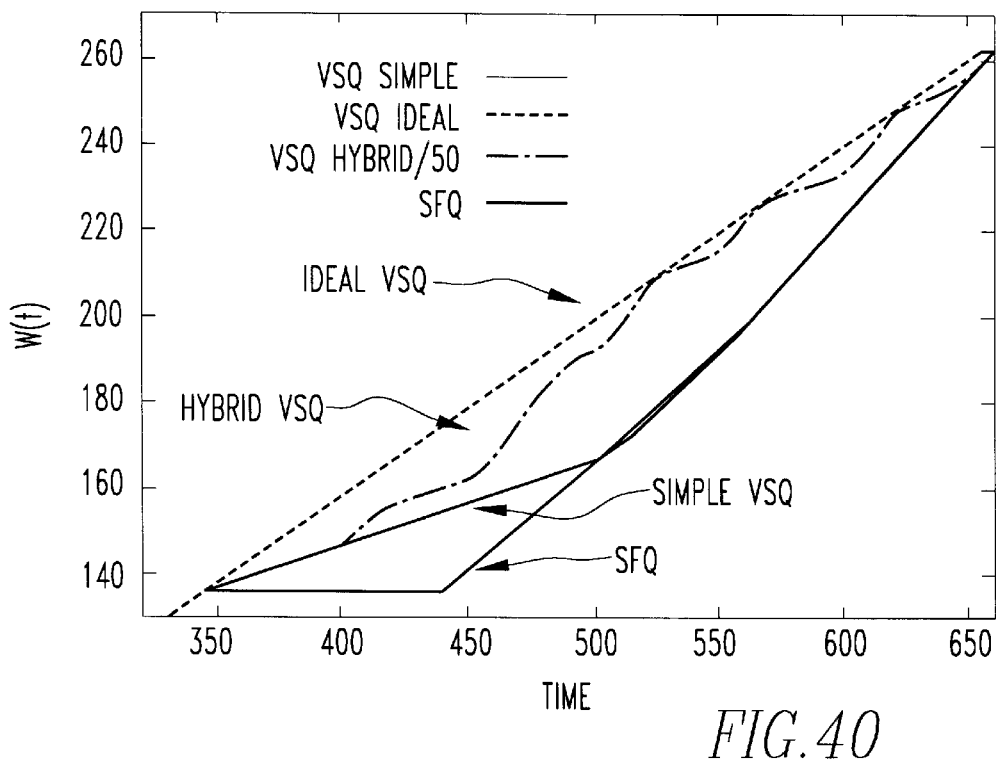
FIG. 40 is a graph of closeup of service received by session 1 under different service disciplines.

A simulation comparison between SFQ and three versions of VSQ is shown in Table 1. Table 1 shows the service and transmission rates for a single server system with 103 sessions. In this scenario the sum of the input rates equals but does not exceed the server rate, so the average service received by each session should equal its rate of transmission. FIG. 38 shows the service given in this scenario to sessions 1,2 and 3 under four

TABLE 1

Simulation Parameters

| session i | $\tau_i$ | $T_i$ |
|---|---|---|
| 1 | .05 | .1 |
| 2 | .15 | .2 |
| 3 | .2 | .4 |
| k, 3 < k ≤ 103 | 001 | .003 | different service disciplines, namely SFQ, Ideal VSQ, Simple VSQ and Hybrid VSQ. The hybrid VSQ service curve is labeled VSQ Hybrid/50 which indicates that the a fixed period of 50 units of time is taken to perform the computation of the $\hat{V}$ Definitions C: Transmission speed of server K: Set of sessions at server V(t): Virtual time of the server at time t $r_k$: Service rate of session k $T_k$: Transmission rate of session k at its source $\Sigma_k$: Depth of session k's leaky bucket $L^i_k$: Length of packet i of session k $a^i_k$: Arrival time of packet i belonging to session k $A_k(t_1, t_2)$: Total traffic arrival belonging to session k in the interval from $t_1$ to $t_2$ $S^i_k$: Virtual starting time of packet i belonging to session k $$S_k^i = \max(F_k^{i-1}, V(a_k^i)) \tag{51}$$

$d^i_k$: Real departure time of packet i belonging to session k $F^i_k$: Virtual finishing time of packet i belonging to session k $$F_k^i = S_k^i + \frac{L_k^i}{r_K} \tag{52}$$

$Q_k(t)$: Size of session k queue at time t

B(t): Set of sessions backlogged at time t $$B(t) \subseteq K \subset K | (k \in B)) \Leftrightarrow (Q_k(t) > 0) \tag{54}$$

A(t): Set of sessions absent at time t $$A(t) \subseteq K \forall k \in K | (k \in A(t)) \Leftrightarrow (Q_k(t) = 0) \tag{54}$$

$W_k(t)$: Work received by session k at time t $W_k(t)$: Normalized work received by session k at time t $U_k(t)$: Work missed (unreceived) by session k at time t $u_k(t)$: Normalized work missed (unreceived) by session k at time t $w_k(t)$: Normalized work received by session k at time t $\Delta_k(t)$: Service lag of session k at time t $\delta_k(t)$: Normalized service lag of session k at time t $l_k(t)$: The number of the last session k packet to have completed service at time t In another embodiment, the present invention pertains to a method for controlling when entities 12 are operated upon by a server 14. The method comprises the steps of receiving requests for service by a server from the entities 12. Each of the requests has a starting time, finishing time when the respective entity is to have received service from the server 14, and an identity associated with the respective entity 12. Then, there is the step of placing in a starting time memory the starting time and the identity of each request. Next, there is the step of placing in a finishing time memory the finishing time and the identity of each request. Next, there is the step of identifying the identity of the entity having the earliest finishing time in the finishing time memory. Next, there is the step of determining whether the entity 12 whose identity has the earliest finishing time has a starting time earlier than virtual time. Then, there is the step of providing service by the server to the entity with the earliest finishing time if its starting time is earlier than virtual time.

After the providing step, there are preferably the steps of deleting the identity, starting time, and finishing time of the entity 12 from the starting time memory and finishing time memory if the entity is provided with service. Then, there is the step of providing service by the server 14 to the entity 12 having the earliest finishing time in the finishing time memory if the entity 12 also has a starting time earlier than virtual time. After the second providing step, there can alternatively be the step of providing service to the entity 12 having the earliest starting time that is also earlier than virtual time if the entity 12 with the earliest finishing time has a starting time later than virtual time. After the second providing step, there can be the step of incrementing virtual time to equal the earliest starting time in the starting time memory, or incrementing virtual time by a unit of virtual time. The starting times in the starting time memory can be sorted by order of starting time, with the earliest starting time being first.

In this way, the scheduler 10 can receive a request from an entity 12 and place it into the starting time memory in regard to its starting time and its identity, and into the finishing time memory in regard to the time it is to have received service from the server 14 and its identity. The scheduler 10 or a controller 22 can determine which entity 12 has the earliest finishing time in the finishing time memory through the identity of the entity also being saved in the finishing time memory with the finishing time of the entity. Preferably, the finishing time memory has the finishing times sorted by order of finishing time to expedite finding the earliest finishing time. Once the earliest finishing time is identified in the finishing time memory, the identity associated with the earliest finishing time is used to identify the associated starting time of the entity in the starting time memory. If the associated starting time is earlier than virtual time, then the earliest finishing time in the finishing time memory is provided service. After service is provided to the entity 12, the identity and the finishing time and starting time in the finishing and starting time memories are deleted. If the entity whose identity in the finishing time memory has the earliest finishing time but a starting time that is later than virtual time, the entity 12 having next earliest finishing time in the finishing time memory can be reviewed in the same manner to determine if it is eligible for service, and so on.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A scheduler for controlling when N entities, where N is an integer $\geq 1$, are operated upon by a server comprising:

a starting time memory having starting times $s_i$ of the N entities, where $1 \leq I < N$ and is an integer, and $s_i$ corresponds to the time the i'th entity first requests service from the server, said starting time memory having only starting times $s_i$ which are greater than virtual time;

a finishing time memory having finishing times $f_i$ of the N entities, where $f_i$ corresponds to the time the i'th entity is to be operated upon by the server, said finishing time memory having finishing times $f_i$ of the N entities whose starting times $s_i$ are less than or equal to virtual time;

a virtual clock that keeps track of virtual time so the starting times $s_i$ and finishing times $f_i$ can be identified; and a controller for choosing entities to be operated upon by the server from the finishing time memory, for entering entities into the finishing time memory from the starting time memory whose starting times $s_i$ become less than or equal to virtual time, and into the starting time memory whose starting times $s_i$ are greater than the virtual time, and for deleting entities from the starting time memory whose starting times $s_i$ become less than or equal to virtual time, said controller connected to the starting time memory, finishing time memory, and virtual clock.

2. A scheduler as described in claim 1 wherein the entities having starting times $s_i$ in the starting time memory are sorted in order of descending times with the entity having the smallest starting time being first, and the controller stores entities having starting times $s_i$ greater than virtual time in the starting time memory in order of descending starting times with the entity having the smallest starting time being first.

3. A scheduler as described in claim 2 wherein the finishing times $f_i$ in the finishing time memory are sorted in order of descending times with the entity having the smallest finishing time being first, and the controller stores entities having starting times $s_i$ less than or equal to virtual time in the order of descending finishing times with the entity having the smallest finishing time being first.

4. A scheduler as described in claim 3 including a second finishing time memory which stores the corresponding finishing times $f_i$ of the entities having starting times stored in the starting time memory.

5. A scheduler as described in claim 4 wherein the controller takes the starting time $s_i$ of an entity in the starting time memory and the corresponding finishing time $f_i$ from the second finishing time memory when the entity's starting time $s_i$ becomes less than or equal to virtual time and sorts and stores the finishing time $f_i$ of the entity in the finishing time memory corresponding to its finishing time.

6. A scheduler as described in claim 5 wherein the controller provides service from the server to the entity having the smallest finishing time in the finishing time memory.

7. A scheduler as described in claim 6 wherein the controller causes the virtual clock to increase virtual time.

8. A scheduler as described in claim 7 wherein the controller causes the virtual clock to increase virtual time a unit of virtual time after a predetermined period of time.

9. A scheduler as described in claim 7 wherein the controller causes the virtual clock to increase virtual time a unit of virtual time after the server provides service to an entity, or to increase virtual time to equal virtual time of the entity having the earliest time in the starting time memory.

10. A scheduler for controlling when N entities, where N is an integer $\geq 1$, are operated upon by a server comprising:

a starting time memory having starting times $s_i$ of the N entities and the identity of at least the entity having the earliest starting time, where $1 \leq i < N$ and is an integer, and $s_i$ corresponds to the time the i'th entity first requests service from the server;

a finishing time memory having finishing times $f_i$ of the N entities and the identity of at least the entity having the earliest finishing time, where $f_i$ corresponds to the time the i'th entity is to be operated upon by the server;

a virtual clock that keeps track of virtual time so the starting times $s_i$ and finishing times $f_i$ can be identified; and a controller for choosing entities to be operated upon by the server from the finishing time memory and which have starting times $s_i$ less than or equal to the virtual time, said controller connected to the starting time memory, finishing time memory, and virtual clock.

11. A scheduler as described in claim 10 wherein the controller provides service from the server to the entity having the smallest finishing time in the finishing time memory and which has an starting time less than or equal to virtual time.

12. A scheduler as described in claim 11 wherein the controller causes the virtual clock to increase virtual time.

13. A scheduler as described in claim 12 wherein the controller causes the virtual clock to increase virtual time a unit of virtual time after a predetermined period of time.

14. A scheduler as described in claim 12 wherein the controller causes the virtual clock to increase virtual time a unit of virtual time after the server provides service to an entity, or to increase virtual time to equal virtual time of the entity having the earliest time in the starting time memory.

15. A method of scheduling when a server provides service to entities comprising the steps of:

requesting service from the server by N entities, where $N \geq 1$ and is an integer;

storing when each of the N entities first requests service from the server, the identity of each of the N entities which requests service from the server and when each of the N entities is to have received service from the server; and providing an entity of the N entities service which has the earliest receiving time and a request time which is less than or equal to virtual time; and incrementing virtual time by one unit of virtual time after a predetermined time.

16. A method as described in claim 15 including after the providing step, there is the step of repeating the providing step in regard to other entities who have requested service from the server.

17. A method as described in claim 16 including after the providing step, there is the step of increasing virtual time.

18. A method as described in claim 17 wherein the incrementing step includes the step of incrementing virtual time one unit of virtual time after a predetermined time.

19. A method as described in claim 17 wherein the incrementing step includes the step of incrementing virtual time one unit of virtual time after the server provides service to an entity, or increasing the virtual time to equal the smallest virtual time of an entity which requested service from the server.

20. A method for controlling when N entities, where $N \geq 1$ and is an integer, are operated upon by a server comprising the steps of:

storing in a starting time memory starting times $s_i$ of the N entities which are greater than virtual time, where $1 \leq I < N$ and is an integer, and $s_i$ corresponds to the time the i'th entity first requests service from the server;

storing in a finishing time memory finishing times $f_i$ of the N entities whose starting times $s_i$ are less than or equal to virtual time; and providing service from the server to an entity having a finishing time $f_i$ in the finishing time memory.

21. A method as described in claim 20 wherein the step of storing in a starting time memory includes the step of sorting the starting times $s_i$ of entities in the starting time memory in order of descending times with the entity having the smallest starting time being first.

22. A method as described in claim 21 wherein the step of storing in a finishing time memory includes the step of sorting the finishing times $f_i$ in the finishing time memory in order of descending finishing times with the entity having the smallest finishing time being first.

23. A method as described in claim 22 including after the step of storing in a starting time memory, there is the step of storing in a second finishing time memory corresponding finishing times $f_i$ of the entities having starting times stored in the starting time memory.

24. A method as described in claim 23 including after the step of storing in the second finishing time memory, there are the steps of taking the starting time $s_i$ of an entity in the starting time memory and the corresponding finishing time $f_i$ from the second finishing time memory when the entity starting time $s_i$ becomes less than or equal to virtual time, sorting the finishing time $f_i$ from the second finishing time memory with the finishing times $f_i$ in the finishing time memory, and storing the finishing time $f_i$ from the second finishing time memory in the finishing time memory.

25. A method as described in claim 24 wherein the providing step includes the step of providing service from the server to the entity whose finishing time $f_i$ has the smallest finishing time in the finishing memory.

26. A method as described in claim 25 including after the providing service step, there is the step of increasing virtual time.

27. A method as described in claim 26 wherein the increasing step includes the step of increasing virtual time a unit of virtual time after a predetermined period of time.

28. A method as described in claim 26 wherein the increasing step includes the step of increasing virtual time a unit of virtual time after the server provides service to an entity, or increasing virtual time to equal virtual time of the entity having the earliest time in the starting time memory.

29. A scheduler for controlling when N entities, where N is an integer $\geq 1$, are operated upon by a server comprising:

a starting time memory having starting times $s_i$ of the N entities and the identity of at least the entity having the earliest starting time, where $1 \leq i < N$ and is an integer, and $s_i$ corresponds to the time the i'th entity first requests service from the server;

a finishing time memory having finishing times $f_i$ of the N entities and the identity of at least the entity having the earliest finishing time, where $f_i$ corresponds to the time the i'th entity is to be operated upon by the server;

a virtual clock that keeps track of virtual time so the starting times $s_i$ and finishing times $f_i$ can be identified; and a controller for choosing the entity having the earliest finishing time from the N entities in the finishing time memory to be operated upon by the server and which has an starting time less than or equal to the virtual time, said controller connected to the starting time memory, finishing time memory, and virtual clock.

30. A scheduler for controlling when N entities, where N is an integer $\geq 1$, are operated upon by a server comprising:

a starting time memory having starting times $s_i$ of the N entities, where $1 \leq I < N$ and is an integer, and $s_i$ corresponds to the time the i'th entity first requests service from the server, said starting time memory having only starting times $s_i$ which are greater than virtual time;

a finishing time memory having finishing times $f_i$ of the N entities, where $f_i$ corresponds to the time the i'th entity is to be operated upon by the server, said finishing time memory having finishing times $f_i$ of the N entities whose starting times $s_i$ are less than or equal to virtual time;

a virtual clock that keeps track of virtual time so the starting times $s_i$ and finishing times $f_i$ can be identified; and a controller for choosing the entity having the smallest finishing time in the finishing time memory of the entities in the finishing time memory to be operated upon by the server, for entering entities into the finishing time memory from the starting time memory whose starting times $s_i$ become less than or equal to virtual time and into the starting time memory whose starting times $s_i$ are greater than the virtual time, and for deleting entities from the starting time memory whose starting times $s_i$ become less than or equal to virtual time, said controller connected to the starting time memory, finishing time memory, and virtual clock.

31. A scheduler as described in claim 29 wherein the controller causes the virtual clock to decrease virtual time.

32. A scheduler as described in claim 30 wherein the controller causes the virtual clock to decrease virtual time.

33. A method for controlling when entities are operated upon by a server comprising the steps of:

receiving requests for service by a server from the entities, each of said requests having a starting time, a finishing time when the respective entity is to have received service from the server, and an identity associated with the respective entity;

placing in a starting time memory the starting time and the identity of each request;

placing in a finishing time memory the finishing time and the identity of each request;

identifying the identity of the entity having the earliest finishing time in the finishing time memory;

determining whether the entity whose identity has the earliest finishing time has a starting time earlier than virtual time; and providing service by the server to the entity with the earliest finishing time if its starting time is earlier than virtual time.

34. The method as described in claim 33 wherein after the providing step, there are the steps of deleting the identity, starting time, and finishing time of the entity from the starting time memory and finishing time memory if the entity is provided with service; providing service by the server to the entity having the earliest finishing time in the finishing time memory if the entity also has a starting time earlier than virtual time.

35. The method as described in claim 34 wherein after the second providing step, there is the step of incrementing virtual time to equal the earliest starting time in the starting time memory.

36. A method as described in claim 34 wherein after the second providing step, there is the step of incrementing virtual time by a unit of virtual time.

37. A method as described in claim 33 wherein after the providing step, there is the step of providing service to the entity having the earliest starting time that is also earlier than virtual time if the entity with the earliest finishing time has a starting time later than virtual time.

* * * * *